US012687525B2

(12) United States Patent
Ramakrishnan et al.

(10) Patent No.: US 12,687,525 B2
(45) Date of Patent: Jul. 21, 2026

(54) METHODS AND SYSTEMS FOR ACOUSTIC DETERMINATION OF GAS COMPOSITION

(71) Applicant: ARAMCO SERVICES COMPANY, Houston, TX (US)

(72) Inventors: Vijay Ramakrishnan, Houston, TX (US); Alejandro Vera, Houston, TX (US); Muhammad Arsalan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 79 days.

(21) Appl. No.: 18/651,495

(22) Filed: Apr. 30, 2024

(65) Prior Publication Data
US 2025/0334552 A1     Oct. 30, 2025

(51) Int. Cl.
*G01N 29/44* (2006.01)
*F17D 5/00* (2006.01)
(Continued)

(52) U.S. Cl.
CPC ......... *G01N 29/4481* (2013.01); *F17D 5/005* (2013.01); *G01N 29/024* (2013.01); (Continued)

(58) Field of Classification Search
CPC ............. G01N 29/4481; G01N 29/024; G01N 29/032; G01N 29/46; G01N 29/0215; (Continued)

(56) References Cited

U.S. PATENT DOCUMENTS

| | | | |
|---|---|---|---|
| 6,601,458 B1 | 8/2003 | Gysling | |
| 7,171,315 B2 | 1/2007 | Loose | |

(Continued)

FOREIGN PATENT DOCUMENTS

| | | | |
|---|---|---|---|
| CN | 116067437 A | 5/2023 | |
| EP | 1565709 B1 | 3/2014 | |

(Continued)

OTHER PUBLICATIONS

Hansen, Laerke Skov et al., "Multi-Phase Flow Metering in Offshore Oil and Gas Transportation Pipelines: Trends and Perspectives"; Sensors; vol. 19, Issue 9, Article 2184; pp. 1-26; May 2019 (26 pages).

(Continued)

*Primary Examiner* — William M Mccalister
(74) *Attorney, Agent, or Firm* — Osha Bergman Watanabe & Burton LLP

(57) ABSTRACT

Methods and systems for determining a composition of a gas in a pipe using a plurality of pressure sensors disposed along the pipe. Each pressure sensor in the plurality of pressure sensors may include a diaphragm for sensing pressure that is aligned with an inner wall of the pipe, and the location of each pressure sensor in the plurality of pressure sensors may be known. The method generally includes obtaining a plurality of pressure signals from the plurality of pressure sensors, determining, using the plurality of pressure signals, a speed of sound of the gas, and determining, using the plurality of pressure signals, an attenuation of sound intensity of the gas. The method further includes determining, with a computational model, the composition of the gas, based on the determined speed of sound of the gas and the attenuation of sound intensity of the gas.

19 Claims, 15 Drawing Sheets

(51) Int. Cl.

| | |
|---|---|
| *G01N 29/024* | (2006.01) |
| *G01N 29/032* | (2006.01) |
| *G01N 29/22* | (2006.01) |
| *G01N 29/46* | (2006.01) |

(52) U.S. Cl.
CPC ......... *G01N 29/032* (2013.01); *G01N 29/222* (2013.01); *G01N 29/4472* (2013.01); *G01N 29/46* (2013.01); *G01N 2291/021* (2013.01); *G01N 2291/0215* (2013.01); *G01N 2291/02809* (2013.01)

(58) Field of Classification Search
CPC ..... G01N 29/02809; G01N 2291/0215; G01N 2291/02809; G01N 29/222; G01N 29/442; G01N 2291/021; F17D 5/005
See application file for complete search history.

(56) References Cited

U.S. PATENT DOCUMENTS

| | | | | |
|---|---|---|---|---|
| 7,281,415 | B2 | 10/2007 | Johansen | |
| 7,328,624 | B2 | 2/2008 | Gysling et al. | |
| 9,476,742 | B2 | 10/2016 | Camilleri | |
| 10,260,919 | B2 | 4/2019 | Dietz et al. | |
| 10,473,501 | B2 | 11/2019 | Parry et al. | |
| 10,480,312 | B2 | 11/2019 | Xiao et al. | |
| 10,768,146 | B1 * | 9/2020 | Burtea ................. | G01N 29/032 |
| 10,876,393 | B2 | 12/2020 | Rendusara et al. | |
| 11,428,560 | B2 | 8/2022 | Fjalestad et al. | |
| 11,726,064 | B2 * | 8/2023 | Burtea ................... | G01N 29/07 702/159 |
| 12,203,893 | B2 * | 1/2025 | DiFoggio .............. | E21B 49/081 |
| 2003/0172734 | A1 * | 9/2003 | Greenwood ....... | G01N 29/4427 73/61.79 |
| 2004/0210404 | A1 | 10/2004 | Gysling et al. | |
| 2005/0005712 | A1 | 1/2005 | Gysling et al. | |
| 2005/0125170 | A1 | 6/2005 | Gysling et al. | |
| 2007/0006640 | A1 | 1/2007 | Gysling | |
| 2007/0027638 | A1 | 2/2007 | Fernald et al. | |
| 2009/0223662 | A1 | 9/2009 | Shaw et al. | |
| 2013/0272898 | A1 | 10/2013 | Toh et al. | |
| 2014/0012507 | A1 | 1/2014 | Trehan et al. | |
| 2014/0076547 | A1 | 3/2014 | Unalmis et al. | |
| 2014/0278154 | A1 | 9/2014 | McGill, Sr. | |
| 2016/0313160 | A1 | 10/2016 | Ueberschlag et al. | |
| 2018/0231498 | A1 | 8/2018 | Amir et al. | |
| 2021/0302405 | A1 | 9/2021 | Al Shahri et al. | |
| 2021/0340869 | A1 | 11/2021 | Syresin et al. | |
| 2022/0026248 | A1 | 1/2022 | Xu et al. | |

FOREIGN PATENT DOCUMENTS

| | | | |
|---|---|---|---|
| EP | 2411799 | B1 | 5/2020 |
| EP | 3 835 751 | A1 | 6/2021 |
| WO | 2009120770 | A1 | 10/2009 |
| WO | 2016/153483 | A1 | 9/2016 |

OTHER PUBLICATIONS

Farahani, Abolfazl Varvani et al., "Multi-phase flow measurement in a gas refinery using decentralized Lyapunov-based adaptive observer"; Transactions of the Institute of Measurement and Control; vol. 43, Issue 3; pp. 700-716; Feb. 2021 (17 pages).

Metwally, Ibrahim A. et al., "Comparative investigation of lightning impulse tests on electrical submersible pump motors"; Electric Power Systems Research; vol. 77, Issue 8; pp. 1065-1072; Jun. 2007 (8 pages).

Hristov, Ivan et al., "Vibrational effects on the dynamic pressure measurement standard based on a diaphragmless shock tube"; Measurement: Sensors; vol. 18, Article 100116; pp. 1-4; Dec. 2021 (4 pages).

N. Glen et al., "Measurement Challenges for Carbon Capture and Storage", Measurement + Control, Apr. 2011, vol. 44, No. 3, pp. 81-85 (5 pages).

G. J. Collie et al., "Review of Flowmeters for Carbon Dioxide Transport in CCS Applications" Greenhouse Gases: Science and Technology, 2017, vol. 7, pp. 1-19 (19 pages).

R. TJ. Porter et al., "The range and level of impurities in CO2 streams from different carbon capture sources", Intl. J. of Greenhouse Gas Control, 2015, vol. 36, 00. 161-174 (14 pages).

T. Green et al., "Two-Phase CO2 Measurement and Control in the Yates oil field", Measurement Control, 2008, vol. 41, pp. 205-207 (3 pages).

L. Wang et al., "Mass flow measurement of gas-liquid two-phase CO2 in CCS transportation pipelines using Coriolis flowmeters" Intl. J. of Greenhouse Gas Control, 2018, vol. 68, pp. 269-275 (7 pages).

J. Weinstein, "Multiphase Flow in Coriolis Mass Flow Meters— Error Sources and Best Practices", 28th Internationla North Sea Flow Measurement Workshop, 2010 (19 pages).

D. N. Alleyne et al., "A 2-Dimensional Fourier Transform Method For The Quantitative Measurement Of Lamb Modes", Ultrasonics Symposium, 1990, pp. 1143-1146 (4 pages).

D. Alleyne et al., "A two-dimensional Fourier transform method for the measurement of propagating multimode signals", The Journal of the Acoustical Society of America, 1991, vol. 89, No. 3, pp. 1159-1168 (10 pages).

International Search report issued for corresponding International Patent Application No. PCT/US2024/025795, mailed Jul. 12, 2024 (6 pages).

Written Opinion report issued for corresponding International Patent Application No. PCT/US2024/025795, mailed Jul. 12, 2024 (7 pages).

Non-Final Office Action issued by the U.S. Patent Office for corresponding U.S. Appl. No. 18/306,013, mailed May 12, 2025 (12 pages).

International Search Report issued for corresponding international patent application No. PCT/US2025/025071, mailed Jul. 9, 2025 (5 pages).

Written Opinion issued for corresponding international patent application No. PCT/US2025/025071, mailed Jul. 9, 2025 (9 pages).

* cited by examiner

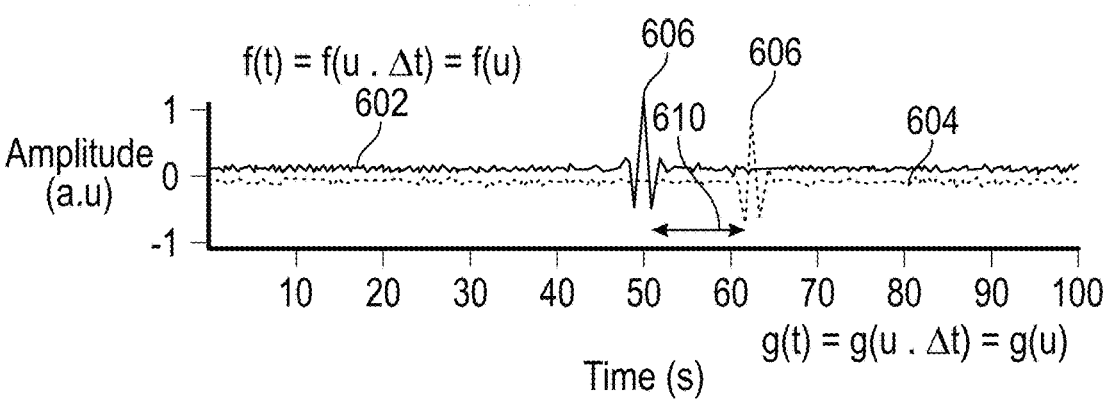
FIG. 6A
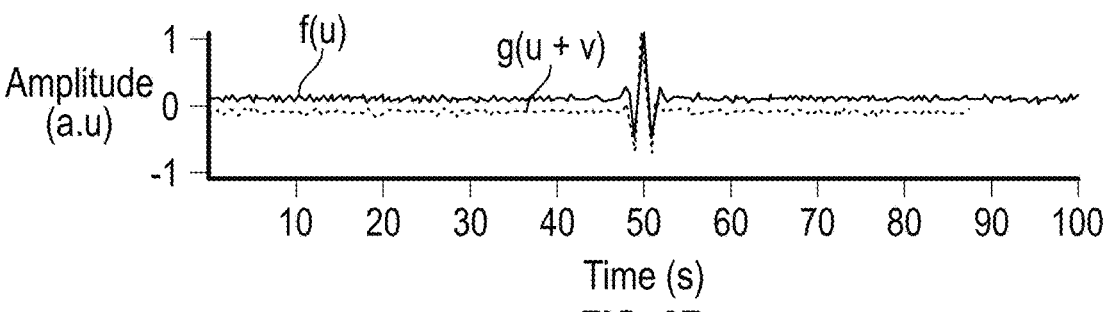
FIG. 6B
FIG. 6C

METHODS AND SYSTEMS FOR ACOUSTIC DETERMINATION OF GAS COMPOSITION

BACKGROUND

In many industrial settings, such as those involving natural gas pipelines and grids, more than one gas may flow within the same pipe, creating gas mixtures with multiple components present in different amounts with respect to one another. Sometimes a single gas of unknown composition may be present. Accurate real-time measurements of the composition of gas mixtures are useful for monitoring gas quality, predicting the impact of the gases on the equipment, and ensuring accurate custody transfer of gases, among other applications not listed. Accordingly, there exists a need to produce cost effective, time efficient, and reliable methods and systems for measuring the composition of gases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the present disclosure generally relate to a method for determining a composition of a gas in a pipe using a plurality of pressure sensors disposed along the pipe. Each pressure sensor in the plurality of pressure sensors may include a diaphragm for sensing pressure that is aligned with an inner wall of the pipe, and the location of each pressure sensor in the plurality of pressure sensors may be known. The method generally includes obtaining a plurality of pressure signals from the plurality of pressure sensors, determining, using the plurality of pressure signals, a speed of sound of the gas, and determining, using the plurality of pressure signals, an attenuation of sound intensity of the gas. The method further includes determining, with a computational model, the composition of the gas, based on the determined speed of sound of the gas and the attenuation of sound intensity of the gas.

Embodiments of the present disclosure generally relate to a system for determining a composition of a gas, including a pipe, a plurality of pressure sensors disposed on the pipe, and a pressure control system. Each pressure sensor in the plurality of pressure sensors may include a diaphragm for sensing pressure. The diaphragm of each pressure sensor may be aligned with an inner wall of the pipe such that each pressure sensor is flush-mounted on the inner wall of the pipe, and a location of each pressure sensor in the plurality of pressure sensors may be known. The pressure control system generally includes one or more processors and a non-transitory computer-readable memory comprising computer-executable instructions stored thereon that, when executed on the one or more processors, cause the processor to perform the following steps. The steps include obtaining a plurality of pressure signals from the plurality of pressure sensors, determining, using the plurality of pressure signals, a speed of sound of the gas, and determining, using the plurality of pressure signals, an attenuation of sound intensity of the gas. The steps further include determining, with a computational model, the composition of the gas, based on the determined speed of sound of the gas and the attenuation of sound intensity of the gas.

Embodiments of the present disclosure generally relate to a non-transitory computer-readable memory comprising computer-executable instructions stored thereon that, when executed on a processor, cause the processor to perform the following steps. The steps include obtaining a plurality of pressure signals from a plurality of pressure sensors measuring pressure waves transmitted through a gas contained in a pipe. A location of each pressure sensor in the plurality of pressure sensors may be known. The steps further include determining, using the plurality of pressure signals, a speed of sound of the gas, and determining, using the plurality of pressure signals, an attenuation of sound intensity of the gas. In addition, the steps include determining, with a computational model, a composition of the gas, based on the determined speed of sound of the gas and the attenuation of sound intensity of the gas.

Other aspects and advantages of the claimed subject matter will be apparent from the following description and the appended claims.

BRIEF DESCRIPTION OF DRAWINGS

FIG. 6A depicts two time-series signals, in accordance with one or more embodiments.

FIG. 6B depicts two time-series signals, where one signal has been shifted in time, in accordance with one or more embodiments.

FIG. 6C depicts a cross-correlation result in accordance with one or more embodiments.

DETAILED DESCRIPTION

Figure 1:
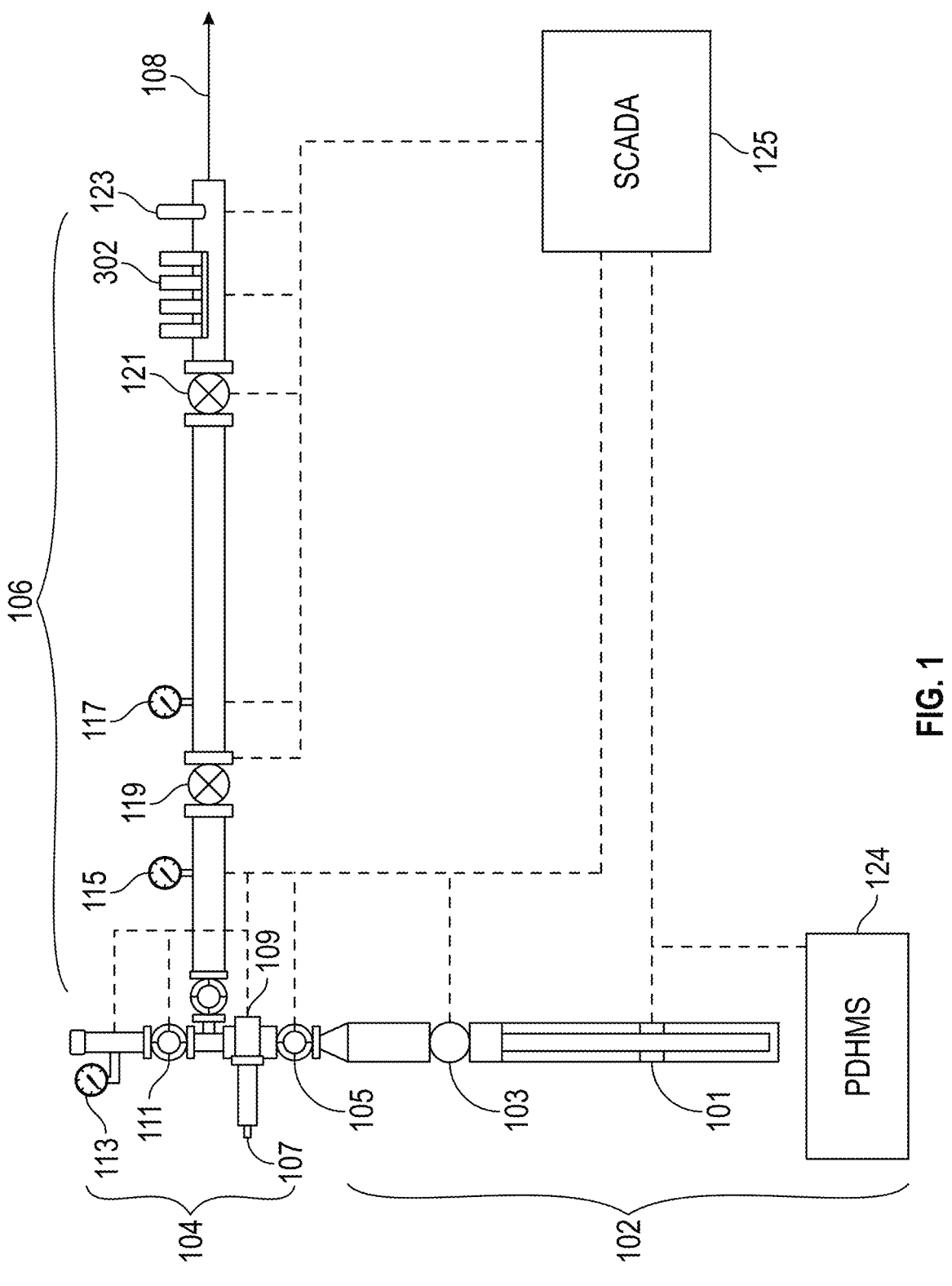
FIG. 1 depicts a pipeline in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-10, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein generally relate to systems and methods to measure the composition of a gas in a conduit for transporting a fluid, such as a pipe in a pipeline or grid. The gas may be a gas mixture containing a plurality of individual gases that are present in different amounts relative to each other (for example, at different levels of concentration), such as a mixture of including methane, ethane, and propane. In some instances, hydrogen may also be included by the gas mixture. The methods and systems are also applicable to gas pipelines and grids where the gas mixture is dominated by a single gas with some impurities (e.g., a hydrogen-rich gas mixture where hydrogen comprises ≥95% of the gas). For mixtures of gases, the speed that sound travels within the gas (speed of sound, or SoS) and the manner in which the sound intensity decreases (or is attenuated) across a known length (or with respect to sound frequency), are each sensitive to the composition of the gas mixture along with other thermophysical properties and/or conditions of the gas mixture such a temperature and pressure. Similarly, in the case of an individual gas (i.e., single-constituent gas), e.g., substantially pure hydrogen gas, the properties of SoS and attenuation depend on the individual gas (e.g., hydrogen, carbon dioxide, etc.), along with other thermophysical quantities such as temperature and pressure. The composition of the gas is determined via acoustic diagnostics, such as speed of sound and sound intensity attenuation, using a plurality of pressure signals measured by a plurality of pressure sensors disposed within a pipe of the pipeline or grid. In one or more embodiments, the composition of the gas mixture is determined using a computational model. The computational model may include empirical look-up tables of speed of sound and sound intensity attenuation for various gas mixtures flowing in different conditions. The computational model may also apply one or more data processing techniques, such as measuring correlations through multivariate polynomial modeling, for example. In one or more embodiments, the computational model includes a machine learning (ML) model that has been trained on data of flowing gas mixtures under a variety of conditions. Applications of embodiments disclosed herein may be used, for example, effectively as an acoustic spectrometer disposed within the pipeline or grid. Measuring the speed of sound of a gas mixture, as will be explained in further detail below, also involves measuring the bulk flow velocity of the gas from the plurality of pressure signals. Determining the composition of gas mixtures is essential to maintain and operate gas pipelines and grids and to ensure the components of gas pipelines and grids are within operational and safety limits, to monitor gas quality, to calculate calorific values of energy stored in the system gas, and to ensure accurate custody transfer of gases during transportation. Determining the composition of the gas may accordingly included as part of a process to achieve one or more of the aforementioned objectives or for other objectives not described. For example, in accordance with one or more embodiments, a control valve within the fluid conduit (e.g., a pipe) may be opened or closed in response to the determination of the composition of the gas. Opening or closing the control valve within the fluid conduit may ensure the pipeline or grid is within a predetermined operational or safety limit, partition a portion of gas for estimating energy expenditure, and separate portion a portion of gas for transporting the gas elsewhere.

In accordance with one or more embodiments, FIG. 1 depicts a simplified portion of a pipeline (100) of a multi-lateral well in an oil and gas field. Herein, an oil and gas field is broadly defined to consist of wells which produce at least some oil and/or gas. Hydrocarbon wells typically produce oil, gas, and water in combination. The relative amounts of oil, gas, and water may differ between wells and vary over any one well's lifetime.

For clarity, the pipeline (100) is divided into three sections; namely, a subsurface (102) section, a tree (104) section, and a flowline (106) section. It is emphasized that pipelines (100) and other components of wells and, more generally, oil and gas fields may be configured in a variety of ways. As such, one with ordinary skill in the art will appreciate that the simplified view of FIG. 1 does not impose a limitation on the scope of the present disclosure. As part of the subsurface (102) section, FIG. 1 shows an inflow control valve (ICV) (101). An ICV (101) is an active component usually installed during well completion. The ICV (101) may partially or completely choke flow into a well. Generally, multiple ICVs (101) are installed along the reservoir section of a wellbore. Each ICV (101) is separated from the next by a packer. Each ICV (101) can be adjusted and controlled to alter flow within the well and, as the reservoir depletes, prevent unwanted fluids from entering the wellbore. The subsurface (102) section of the pipeline (100) has a subsurface safety valve (SSSV) (103). The SSSV (103) is designed to close and completely stop flow in the event of an emergency. Generally, an SSSV (103) is designed to close on failure. That is, the SSSV (103) requires a signal to stay open and loss of the signal results in the closing of the valve. Also shown as part of the subsurface (102) section is a permanent downhole monitoring system (PDHMS) (124). The PDHMS (124) consists of a plurality of sensors, gauges, and controllers to monitor subsurface flowing and shut-in pressures and temperatures. As such, a PDHMS (124) may indicate, in real-time, the state or operating condition of subsurface equipment and the fluid flow.

Turning to the tree (104) section of FIG. 1, tree (104) has a master valve (MV) (105), a surface safety valve (SSV) (107), and a wing valve (WV) (109). The MV (105) controls all flow from the wellbore. For safety considerations, a MV (105) is usually considered so important that two master valves (MVs) (second not shown) are used wherein one acts as a backup. Like the SSSV (103), the SSV (107) is a valve installed on the upper portions of the wellbore to provide emergency closure and stoppage of flow. Again, SSVs (107) are designed to close on failure. One or more WVs (109) may be located on the side of the tree (104) section, or on temporary surface flow equipment (not shown). WVs (109) may be used to control and isolate production fluids and/or be used for treatment or well-control purposes.

Also shown in FIG. 1 is a control valve (CV) (111) and a pressure gauge (PG) (113). The CV (111) is a valve that controls a process variable, such as pressure, flow, or temperature, by modulating its opening. The PG (113) monitors the fluid pressure at the tree (104) section.

Turning to the flowline (106) section, the flowline (106) transports (108) the fluid from the well to a storage or processing facility (not shown). A choke valve (119) is disposed along the flowline (106). The choke valve (119) is used to control flow rate and reduce pressure for processing the extracted fluid at a downstream processing facility. In particular, effective use of the choke valve (119) prevents damage to downstream equipment and promotes longer periods of production without shut-down or interruptions. The choke valve (119) is bordered by an upstream pressure transducer (115) and a downstream pressure transducer (117) which monitor the pressure of the fluid entering and exiting the choke valve (119), respectively. The flowline (106) shown in FIG. 1 has a block and bleed valve system (121) which acts to isolate or block the flow of fluid such that it does not reach other downstream components. The flowline (106) may also be outfitted with one or more temperature sensors (123).

The various valves, pressure gauges and transducers, and sensors depicted in FIG. 1 may be considered devices of an oil and gas field. As shown, these devices may be disposed both above and below the surface of the Earth. These devices are used to monitor and control components and sub-processes of an oil and gas field. It is emphasized that the oil and gas field devices depicted in FIG. 1 are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency.

The oil and gas field devices may be distributed, local to the sub-processes and associated components, global, connected, etc. The devices may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a pipeline (100). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In accordance with one or more embodiments, FIG. 1 depicts a supervisory control and data acquisition (SCADA) system (125). A SCADA system (125) is a control system that includes functionality for device monitoring, data collection, and issuing of device commands. The SCADA system (125) enables local control at an oil and gas field as well as remote control from a control room or operations center. To emphasize that the SCADA system (125) may monitor and control the various devices of an oil and gas field, dashed lines connecting the plurality of oil and gas field devices to the SCADA system (125) are shown in FIG. 1.

Oil and gas field devices, like those shown in FIG. 1 (and others not shown), monitor and govern the behavior of the components and sub-processes of the oil and gas field. Therefore, the productivity of the oil and gas field is directly affected, and may be altered, by the devices. Generally, complex interactions between oil and gas field components and sub-process exist such that configuring field devices for optimal production is a difficult and laborious task. Further, the state and behavior of oil and gas fields is transient over the lifetime of the constituent wells requiring continual changes to the field devices to enhance production.

In some instances, the pipeline (100) may further be outfitted with a flow meter (e.g., multiphase flow meter (MPFM)) or other device to measure the flow rate of a fluid in the pipeline (100).

Figure 2:
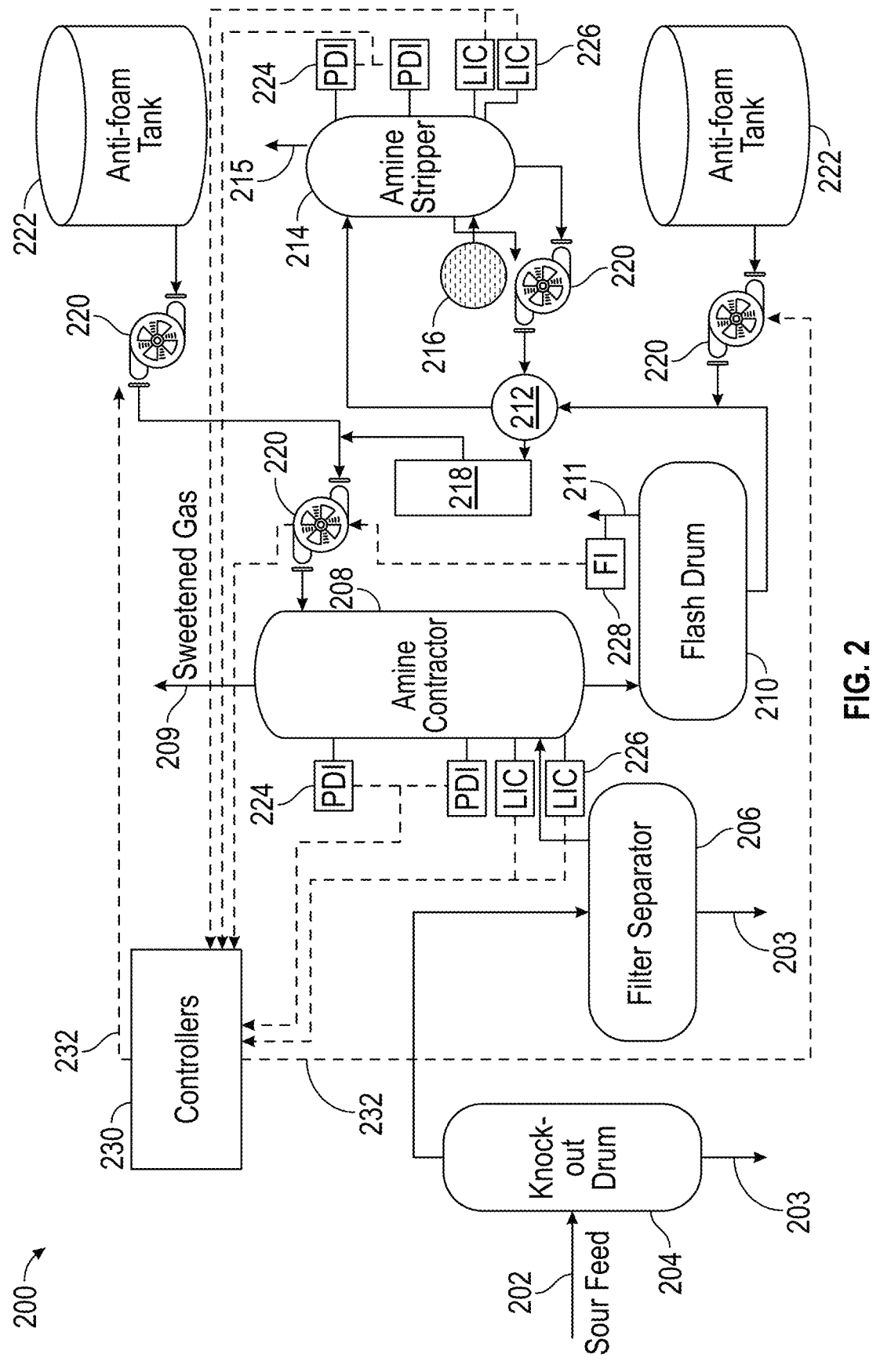
FIG. 2 depicts a gas processing plant in accordance with one or more embodiments.

Another example system in which embodiments disclosed herein may be applied is depicted in FIG. 2. Specifically, FIG. 2 depicts an example gas processing plant (200). In some implementations, the gas processing plant (200) can receive a fluid (e.g., a gas mixture) from a pipeline (100) like that shown in FIG. 1. The gas processing plant (200) itself may be composed of many flowlines, pipes, or pipe grids, each conveying a fluid where the constituents and composition (e.g., relative concentrations of constituents) can change between pipelines as the received fluid is processed.

In general, in the context of oil and gas, gas processing encompasses a wide range of industrial processes that seek to separate and extract desired gaseous hydrocarbons from an incoming contaminated fluid. The incoming fluid may be multiphase and be composed of many different solid, liquid, and gas constituents. Contaminants may include solids like sand, liquid like water or crude oil, and other gases. A gas processing plant may employ various "sub-processes," or methods and industrial processes, in series and/or in parallel. Additionally, the sub-processes may be arranged in a cyclical manner. Typically, each sub-process is governed by a set of control parameters. As a non-limiting example, control parameters may be the temperature of the environment of a sub-process, or the flow rate of a fluid, or the amount of a chemical additive used in a sub-process.

FIG. 2 depicts the flow of fluid through an example gas processing plant (200). One with ordinary skill in the art will recognize that gas processing plants (200) may be configured in a variety of ways according to plant-specific needs and applications. As such, the set of sub-processes shown in FIG. 2, and their arrangement, are non-limiting. Additionally, sub-processes are often associated with a mechanical device, such as a tank or a heat exchanger. For the purposes of FIG. 2, components of the gas processing plant (200), may be described according to their function (sub-process) or their mechanical form without undue ambiguity. In other words, a tank or a drum may herein be described as a sub-process or a mechanical device.

Contaminations in hydrocarbon (HC) feeds of a gas processing facility is an ongoing challenge as it causes operational upsets resulting in increases of maintenance cost and loss of production. Early identification and quantification the level of the contaminations in the HC feeds enables to take adequate preventive action in order to minimize operational upsets, reduce down time and maintenance cost as well as increase the productivity. Determination of the composition of a gas (i.e., the constituents of the gas and their concentrations) can be used to identify contaminates and undesired individual gases.

As shown in FIG. 2, an incoming contaminated fluid (202) is sent to a gas processing plant (200) via a flowline (e.g., flowline (106)). In the context of gas processing, the incoming contaminated fluid (202) may be called the "sour feed." The incoming contaminated fluid (202) may be multiphase and be composed of a variety of solid, liquid, and gaseous constituents. For example, the incoming contaminated fluid (202) may contain solid particulates like sand, mineral precipitates such as pipe scale, and corroded pipe, liquid such as water, and gases like carbon dioxide ($CO_2$) and hydrogen sulfide ($H_2S$). In particular, $H_2S$, in the presence of water, is highly corrosive and should be removed to prevent a leak in the pipeline. Additionally, the incoming contaminated fluid (202) may contain liquid and gas forms of various hydrocarbons.

In the example gas processing plant (200) of FIG. 2, the incoming contaminated fluid (202), or sour feed, is processed by a knock-out drum (204). The knock-out drum (204) performs bulk separation of gas and liquid. Liquid, separated from the incoming contaminated fluid (202), exits the knock-out drum (204) through a liquid exit (203).

From the knock-out drum (204), the bulk gas is processed by a filter separator (206). A filter separator (206) removes impurities such as mineral precipitates (e.g., pipe scale), water, liquid hydrocarbons, and iron sulfide from the fluid. A filter separator (206) uses filter elements, such as a replaceable sock or a coalescing filter, rather than mechanical components to separate out contaminants. According to the application, a filter separator (206) may be composed of 1 or 2 stages and may operate at high or low pressure. Again, the unwanted portions of the incoming contaminated fluid (202) exit the filter separator (206) through an exit (203).

After the filter separator (206), the incoming contaminated fluid (202) has been reduced to a gaseous stream. The gaseous stream undergoes another purifying sub-process through an amine contactor (208). An amine contactor (208) absorbs carbon dioxide ($CO_2$) and/or hydrogen sulfide ($H_2S$) contaminants from the gaseous stream. In general, an amine contactor (208), receives the partially processed incoming contaminated fluid (202), or gaseous stream, and a "lean" amine liquid. Common amines are diethanolamine (DEA), monoethanolamine (MEA), methyldiethanolamine (MDEA), diisopropanolamine (DIPA), and aminoethoxyethanol (Diglycolamine) (DGA). The contact between the gaseous stream and the lean amine liquid drives the absorption of $CO_2$ and/or $H_2S$ into the amine liquid from the gaseous stream. As a result, decontaminated gas (209), also known as "sweetened gas", may exit the amine contactor (208). The decontaminated gas (209) should be checked to make sure it meets specifications. If the decontaminated gas (209) does not meet specifications, this is indicative that control parameters within the gas processing plant (200) require adjustment. The sub-processes of the knock-out drum (204), filter separator (206), and amine contactor (208) effectively transform the incoming contaminated fluid (202) to a decontaminated gas (209) and complete the objective of the gas processing plant (200). However, additional processes are required to maintain the gas processing plant (200) in an operational state. For example, the liquid amine that has absorbed the unwanted $CO_2$ and $H_2S$, which is called "rich" amine, is sent to an amine stripper for removal of its contaminants and re-conditioning.

As shown in FIG. 2, the contaminated amine is first sent to a flash drum (210). This sub-process consists of throttling the contaminated amines causing a pressure drop such that vapors are formed. The vapors exit the flash drum where they undergo further processing, such as being passed to an oxidizer. These steps have been omitted from FIG. 2 for brevity.

The remaining liquid contaminated amines enter a heat exchanger (212). The heat exchanger (212) recovers heat from the decontaminated amine leaving the amine stripper (214), which is described below. Consequently, the heat exchanger (212) heats the contaminated amine before entering the amine stripper (214).

The amine stripper (214) serves to remove the absorbed contaminants, such as $H_2S$ and $CO_2$, from the amine solution so that it can be used again in the amine contactor (208). The amine stripper (214) is equipped with a reboiler (216). The amine stripper (214) contains a tray column consisting of a stripping section and a water wash section at the top. The reboiler (216) takes the amine solution located at the bottom of the amine stripper (214) and partially boils it. Steam (hot, gaseous water) is typically used as the heat source in the reboiler (216). Steam, typically sourced from the reboiler (216), flows up the column in the amine stripper (214) and contacts the contaminated amine solution flowing down within the column. As the contaminated amine contacts the steam, it is heated up and the contaminants are stripped out of the rich amine solution and flow to the stripping section of the column.

The stripped gases, commonly referred to as amine acid gas, leave the amine stripper through a stripped gas exit (215). The stripped gases undergo further processing, such as condensing out the water and passing the remaining acid gases to a sulfur recovery process, but these processes are not shown in FIG. 2 for brevity.

The decontaminated amine solution, leaving the bottom of the amine stripper (214), contains very low quantities of acid gas (such as $H_2S$). This decontaminated amine solution may be recycled in a lean amine storage tank (not shown) and/or returned to the amine contactor (208). As shown in FIG. 2, the decontaminated amine solution leaving the amine stripper (214) is passed through the heat exchanger (212), to transfer heat to the contaminated amine solution leaving the flash drum (210). After passing through the heat exchanger (212), the decontaminated amine solution may be further cooled in a cooler (218) before being returned to the amine contactor (208).

The transport of the various fluids of the gas processing plant of FIG. 2 is facilitated by a plurality of pumps and/or compressors (220) disposed throughout the system. The type of pump or compressor (220), and the location may be altered and arranged according to plant-specific needs.

As noted above, it is emphasized that a gas processing facility (200) may implement different sub-processes and mechanisms for achieving adequate gas processing. Some sub-processes may include compression, stabilization, and dehydration. The gas processing plant (200) may also encompass the treatment of removed water for disposal through sub-processes such as filtration and deionization. Additionally, elements for heating and cooling may be provided to prevent the formation of hydrates, and mitigate corrosion and aid in dehydration, respectively. With respect to decontaminating the incoming contaminated fluid (202), other chemical and physical washes may be used without departing from the scope of this disclosure.

As shown in FIG. 2, the sub-processes may be monitored and controlled by a plurality of sensors and controllers. As an example, the amine contactor (208) and amine stripper (214) are both equipped with pressure differential indicators (PDI) (224) and level indicators (LIC) (226) in FIG. 2. Additionally, FIG. 2 depicts a flow indicator (FI) (228) connected to the exit of the flashed gases exiting the flash drum (210). The PDIs, LICs, and FIs, which are sensors, may send information regarding the pressure difference measured across sub-processes, the quantity and level of fluids present, and the flow rate of fluids, respectively, to a plurality of controllers (230). Flow indicators (FIs) disposed throughout the gas processing plant (200) may be multi-phase flow indicators.

The plurality of controllers (230) may herein be referred to as "controllers" or "controller" where appropriate. Controllers (230) may be distributed, local to the sub-processes and associated device, global, connected, etc. Similar to the discussion under FIG. 1, controllers (230) may include a programmable logic controller (PLC), a distributed control system (DCS), a supervisory control and data acquisition (SCADA), and/or a remote terminal unit (RTU). For example, a programmable logic controller (PLC) may control valve states, fluid levels, pipe pressures, warning alarms, and/or pressure releases throughout a gas processing plant (200).

FIG. 2 also depicts anti-foam tanks (222) which contain an anti-foaming agent that may be injected, by use of a pump (220) and a controller (230), into different parts of the gas processing system as indicated by the dashed line (232). The anti-foam tanks (222) and injection of an anti-foaming agent into the sub-processes of the gas processing plant (200) may be necessary because a frequent problem in gas processing plants (200) is foaming. This problem is usually the result of improper operating conditions in the sub-processes in conjunction with the presence of contaminants. A common mitigative action is to inject an anti-foaming agent into the system.

While the sensors (224, 226, 228, and others not shown) and controllers (230) are necessary for safe and effective operation of a gas processing plant (200), in one or more implementations their effective use dependent on a determination of the composition of a gas at one or more locations (i.e., relative to bounding sub-processes) in the gas processing plant (200).

As stated, determining the composition of gases is essential to maintain and operate gas pipelines and grids (e.g., pipes used in a gas processing plant), ensure the components of gas pipelines and grids are within operational and safety limits, monitor gas quality, calculate calorific values of energy stored in the system gas, and ensure accurate custody transfer of gases during transportation. Further, the composition of the gas may be used to inform the optimal settings for other components (i.e., field devices) on the pipeline (100) (e.g., choke valve (119)) and/or the operation of a gas processing plant (200). Accordingly, pipelines (100) may include devices along the flowline (106), or pipelines and or flowlines of gas processing plant (200), that assist in determining the composition of the gas, such as chemical sensors, gas chromatographs, and optical sensors, among others not listed. However, many of the aforementioned devices for measuring gas composition are costly and difficult to maintain and operate. Consequently, due to cost or other constraints, a systems such as a pipeline (100) or gas processing plant (200) may not have such a device.

In one aspect, embodiments disclosed herein relate to systems and methods for determining the composition of a gas mixture flowing in a fluid-carrying conduit (e.g., a pipe). For instance, the conduit may be the flowline (106) of a pipeline (100), and/or be part of an oil and gas well, or be a pipe used in a gas-processing plant (200). While the term "mixture" generally implies that the gas includes more than one type of gas, embodiments disclosed herein may be applied to pipelines and grids including only one type of gas. The gas may include one or more various individual gases (e.g., methane, propane, ethane, hydrogen gas, etc.) and embodiments disclosed herein will generally be discussed, for concision, under the context of an oil and gas pipeline (100) (or well) (e.g., the flowline (106)). However, one with ordinary skill in the art will appreciate that the system and methods disclosed herein are not limited to gas mixtures consisting only of the listed gases, nor are they limited to the context of an oil and gas well. For example, the systems and methods disclosed herein can be readily used in and applied to one or more portions of a gas processing plant (200).

As will be discussed in the instant disclosure below, the quantities of speed of sound and sound intensity attenuation measured from a plurality of pressure signals are used to determine the composition of gas in a flowing conduit, such as a pipe (e.g., the pipe of a gas processing plant). However, in some instances, determining the speed of sound further requires determining the bulk flow velocity of the gas, if it is flowing. As will be described, the measurements of the speed of sound and the sound intensity attenuation are useful for determining the composition of the gas because these measurements correspond to characteristics of the medium (e.g., gas mixture) through which pressure waves propagate. In one or more embodiments, the system and methods disclosed herein are used to determine, at least, the speed of sound and the sound intensity attenuation of a gas mixture, and further the composition of the gas. In accordance with one or more embodiments, a control valve within the fluid conduit (e.g., a pipe) may be opened or closed in response to the determination of the composition of the gas. Opening or closing the control valve within the fluid conduit may ensure the pipeline or grid is operating safely or according to a predetermined criterion, to isolate a portion of gas for estimating energy output, and to sequester a portion of gas from the pipe in order to transport the gas elsewhere.

The system includes a plurality of pressure sensors. In one or more embodiments, each pressure sensor of the plurality of pressure sensors is a pressure transducer. In one or more embodiments, each pressure transducer can record and transmit pressure data across a broadband range of frequencies (e.g., between 0.1 to 20 kHz). Each pressure sensor of the plurality of pressure sensors is mounted, or otherwise installed in, the fluid-carrying conduit where it is desired to measure, at least, the speed of sound and the sound intensity attenuation. In one or more embodiments, the pressure sensors are installed in the fluid-carrying conduit via a threaded connection (e.g., NPT). The fluid-carrying conduit may be a pipe (e.g., the flowline (106) of an oil and gas pipeline (100), any pipe of a gas processing plant (200)). For concision, hereafter, the system and methods disclosed herein will be discussed using a pipe as an example. A pipe is a fluid-carrying conduit with a substantially circular profile. However, one skilled in the art will recognize that the system and methods disclosed herein can be applied to any fluid-carrying conduit, with any given profile, without departing from the scope of the instant disclosure. Pipes and/or flowlines may have a constant diameter or may have a varying diameter such as in the case of nozzles (including Venturi type nozzles) and diffusers without limitation. Further pipes and/or flowlines may include reducing/expanding pipe fittings and/or adapters, etc. without departing from the scope of this disclosure.

FIG. 1 depicts a plurality of pressure sensors (302) installed on the flowline (106) section of the pipeline (100). In accordance with one or more embodiments, each pressure sensor is mounted, or installed in, the flowline (106) via a threaded connection.

Figure 3A:
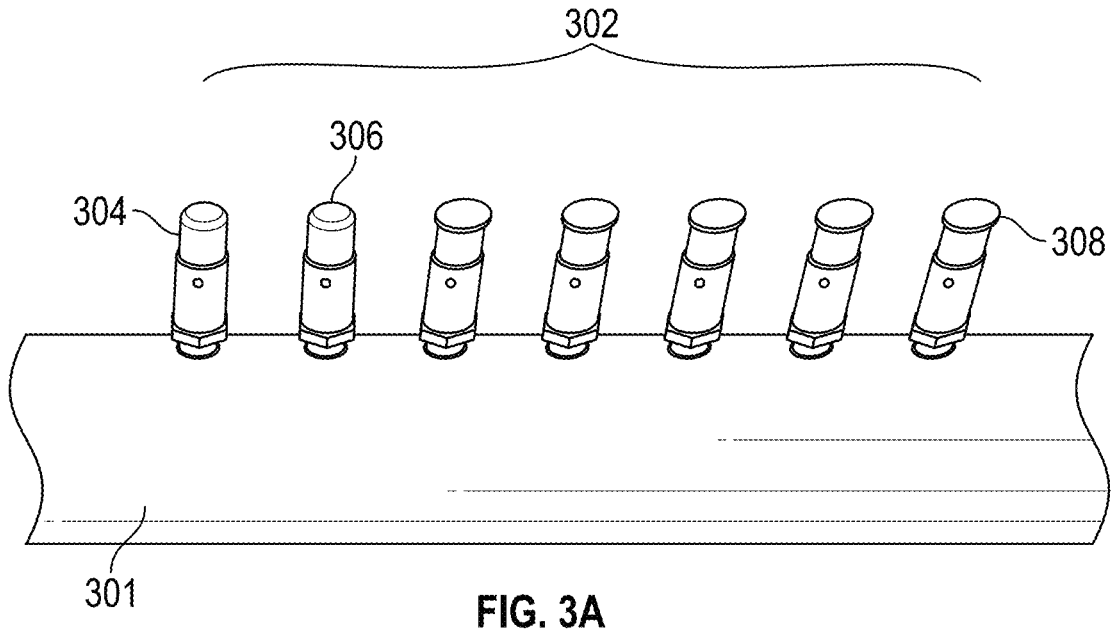
FIG. 3A depicts a plurality of pressure sensors installed in a flowline, in accordance with one or more embodiments.

FIG. 3A depicts a plurality of pressure sensors (302) mounted in a pipe (301) carrying a gas mixture. In general, it may be said that the plurality of pressure sensors consists of N pressure sensors, where N is an integer greater than or equal to 2. Without loss of generality, the pressure sensors in the plurality of pressure sensors (302) may be labelled as a first pressure sensor (304), a second pressure sensor (306), and so on and so forth, until a final $N^{th}$ pressure sensor (308). Under this notation, the pressure sensors in the plurality of pressure sensors (302) are ordered and pressure sensors with consecutive labels (e.g., first and second or second and third) are considered adjacent to one another.

Figure 3B:
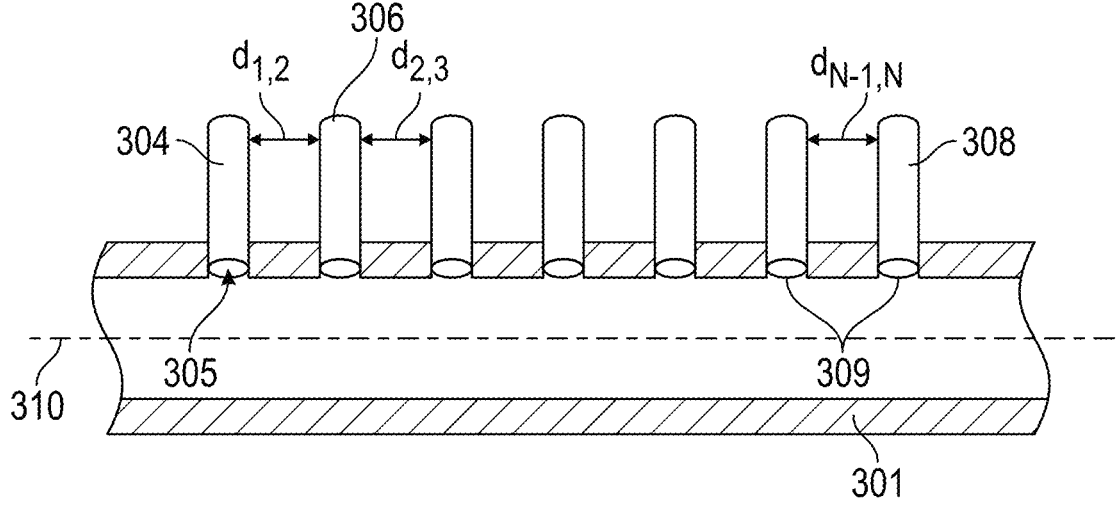
FIG. 3B depicts a section view of a flowline, in accordance with one or more embodiments.

Each pressure sensor in the plurality of pressure sensors comprises a diaphragm (309) for sensing pressure. The diaphragm (309) of each pressure sensor is aligned with an inner wall of the fluid-carrying conduit such that each pressure sensor is flush-mounted on the inner wall of the fluid-carrying conduit. FIG. 3B depicts a section view of the flowline (106) and plurality of pressure sensors (302) shown in FIG. 3A. As seen in the section view of FIG. 3B, the diaphragm (309) of each pressure sensor in the plurality of pressure sensors (302) does not extend into the internal volume enclosed by the pipe (301) nor is the diaphragm recessed into the wall of the pipe (301).

In accordance with one or more embodiments, the system further includes a pressure control system (not shown). The pressure control system is configured to receive and process the pressure signals from each pressure sensor in the plurality of pressure sensors (302). Therefore, it may be said that the pressure control system receives and processes a plurality of pressure signals, where there is a one-to-one correspondence between pressure signals and pressure sensors. In one or more embodiments, the plurality of pressure signals is received and processed directly by a SCADA (125) system, such that the SCADA (125) system may be considered the pressure control system. Use of the SCADA (125) system enables the integration of the plurality of pressure signals with all other field devices connected to the SCADA (125) system. In other embodiments, the pressure control system is a computing device. The computing device may be located proximate to the plurality of pressure sensors (302) such that the computing device is considered an "edge" computing device. In other instances, the computing device is remotely located relative to the plurality of pressure sensors (302).

A fluid-carrying conduit defines a central longitudinal axis. FIG. 3B further depicts the central longitudinal axis (310) of the pipe (301). The pressure sensors in the plurality of pressure sensors (302) are spaced according to an axial spacing and an angular spacing.

The axial spacing defines the distance between adjacent pairs of pressure sensors relative to the central longitudinal axis (310). The distance between any two adjacent pressure sensors in the plurality of pressure sensors (302) is given by $d_{n,n+1}$, where n is an index indicating the pressure sensor and $1 \leq n \leq N-1$. Therefore, in general, the axial spacing can be represented as an array of N−1 distance values (i.e., $[d_{1,2}]$ when N=2 and $[d_{1,2}, \ldots, d_{N-1,N}]$ when N>2). In accordance with one or more embodiments, the pressure sensors in the plurality of pressure sensors (302) are spaced uniformly relative to the central longitudinal axis (310). In this case, $d_{1,2}, \ldots, d_{N-1,N}=d$ such that the axial spacing may be described by a single distance value d without ambiguity.

The angular spacing defines the angle between adjacent pairs of pressure sensors within a plane that is perpendicular to the longitudinal central axis (310). That is, the angular spacing defines a circumferential distance between adjacent pairs of pressure sensors. Like the axial spacing, the angular spacing can be represented as an array of N−1 angles (i.e., $[\theta_{1,2}]$ when N=2 and $[\theta_{1,2}, \ldots, \theta_{N-1,N}]$ when N>2). In accordance with one or more embodiments, the pressure sensors in the plurality of pressure sensors (302) have uniform angular spacing. In this case, $\theta_{1,2}, \ldots, \theta_{N-1,N}=\theta$ such that the angular spacing may be described by a single angle $\theta$ without ambiguity. In the case where the plurality of pressure sensors (302) have uniform angular spacing and $\theta=0$, the plurality of pressure sensors (302) may be said to be arranged linearly. The axial spacing of the plurality of pressure sensors (302) need not be uniform for the arrangement to be considered linear. However, no two sensors can physically be in the same spot so the axial spacing must accommodate, at least, the physical footprint of the pressure sensors.

Figure 4:
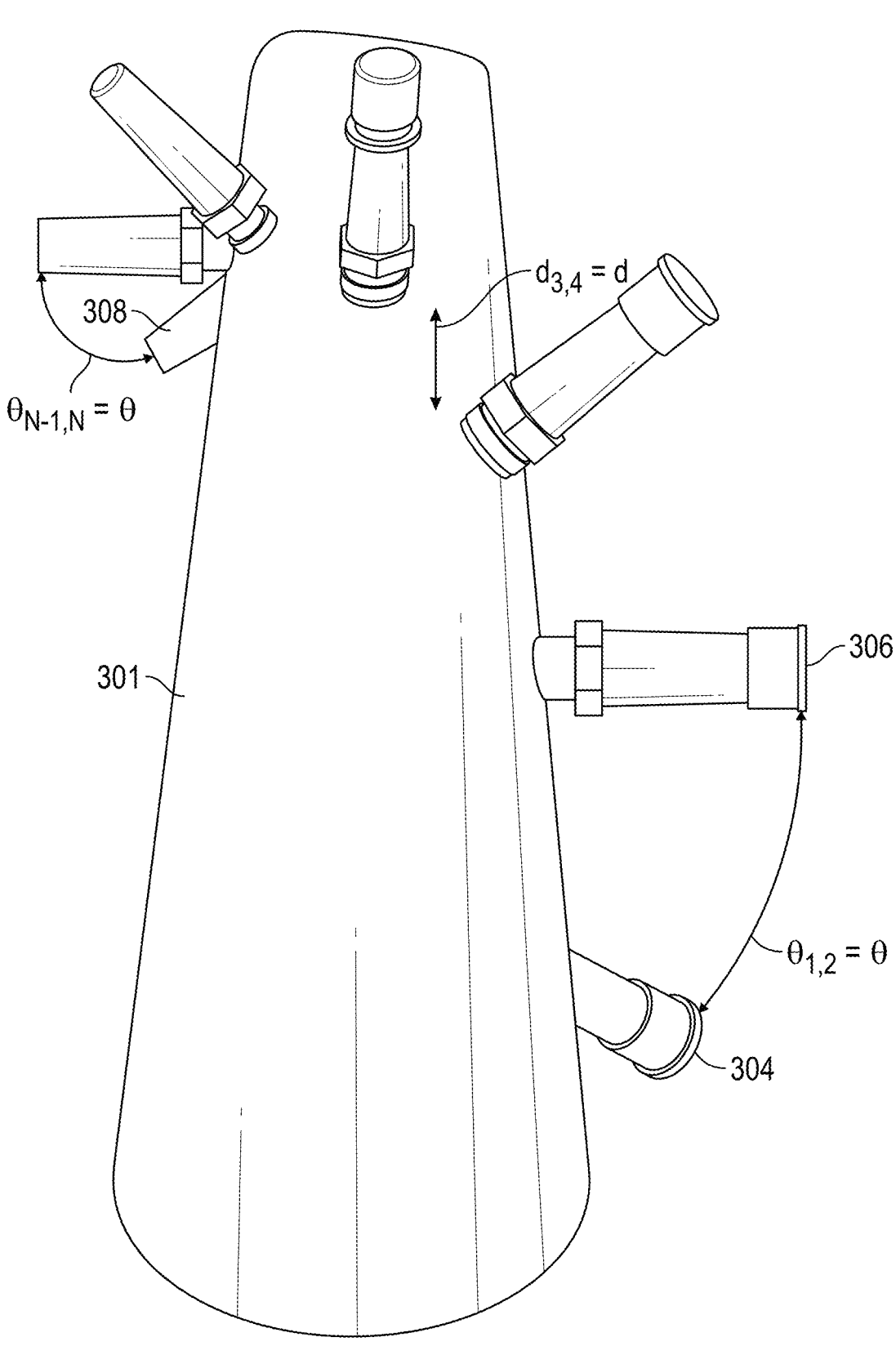
FIG. 4 depicts a plurality of pressure sensors installed in a flowline and arranged according to a helical pattern, in accordance with one or more embodiments.

In accordance with one or more embodiments, the plurality of pressure sensors (302) is installed on a fluid-carrying conduit such that the pressure sensors have uniform axial spacing and uniform angular spacing with d>0 and $\theta$>0. In this case, the plurality of pressure sensors may be said to be arranged helically, or according to a helical arrangement. FIG. 4 depicts a pipe (301) wherein the plurality of pressure sensors (302) are arranged helically. Advantages of a helical arrangement are as follows. It is well-known that pressure disturbances propagate inside a conduit in a three-dimensional manner (i.e., not along a line). Helically disposed pressure sensors take advantage of this phenomenon because the can be arranged to span the entire circumference of the pipe. Further, a helically disposed pressure sensors prevent downstream pressure sensors from getting disturbed by eddies generated by upstream pressure sensors (eddies that would be carried downstream in a relatively straight line by the flow). The mitigation of disturbances from adjacent or upstream pressure sensors achieved by the helical formation increase the signal-to-noise, especially when compared to pressure sensors arranged linearly. Finally, helically disposed pressure sensors allow for a more condensed array of pressure sensors (i.e., a smaller physical footprint along the pipe) because the sensors can be packed closer together (with respect to the central longitudinal axis (310)) due to the angular separation. That is, the angular spacing provided by a helical arrangement allows for a reduction in the axial spacing between pressure sensors. Reduced axial spacing improves the spatial resolution of the measurements and hence may be advantageous in highly-transient flow-classes such as so-called slug flows.

The plurality of pressure signals, as measured by the plurality of pressure sensors, is used to determine the gas speed of sound and the sound intensity attenuation according to methods described in greater detail below. From the speed of sound and the sound intensity attenuation, the composition of the gas may be inferred. In one or more embodiments, a computational model used to determine the composition of the gas. The computational model may include empirical look-up tables, or a database of laboratory measurements, of speed of sound and sound intensity attenuation for various gases and flowing conditions. The computational model may also apply one or more data processing techniques, such as measuring correlations through multivariate polynomial modeling, linear regression, and modeling according to other mathematical functions, for example. In one or more embodiments, the computational model uses a machine learning (ML) model to determine the composition of the flowing gas.

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning (ML), will be adopted herein, however, one skilled in the art will recognize that the concepts and methods detailed hereafter are not limited by this choice of nomenclature.

Machine learning (ML) model types may include, but are not limited to, neural networks, decision trees, random forests, support vector machines, generalized linear models, and Bayesian regression. ML model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture." Generally, multiple model types and associated hyperparameters are tested and the model type and hyperparameters that yield the greatest predictive performance on a hold-out set of data is selected.

Figure 5A:
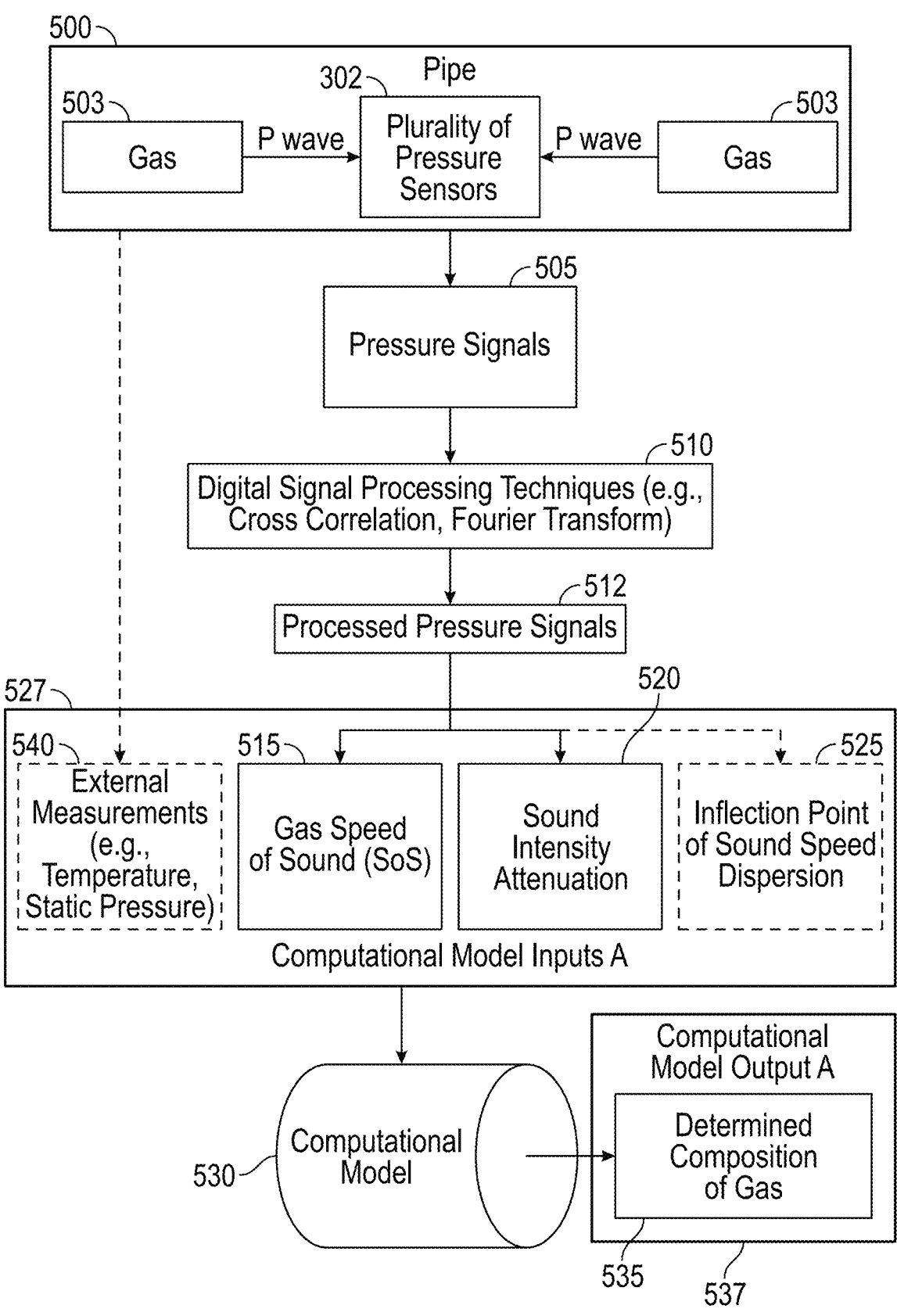
FIGS. 5A-5C depict systems according to one or more embodiments.
Figure 5B:
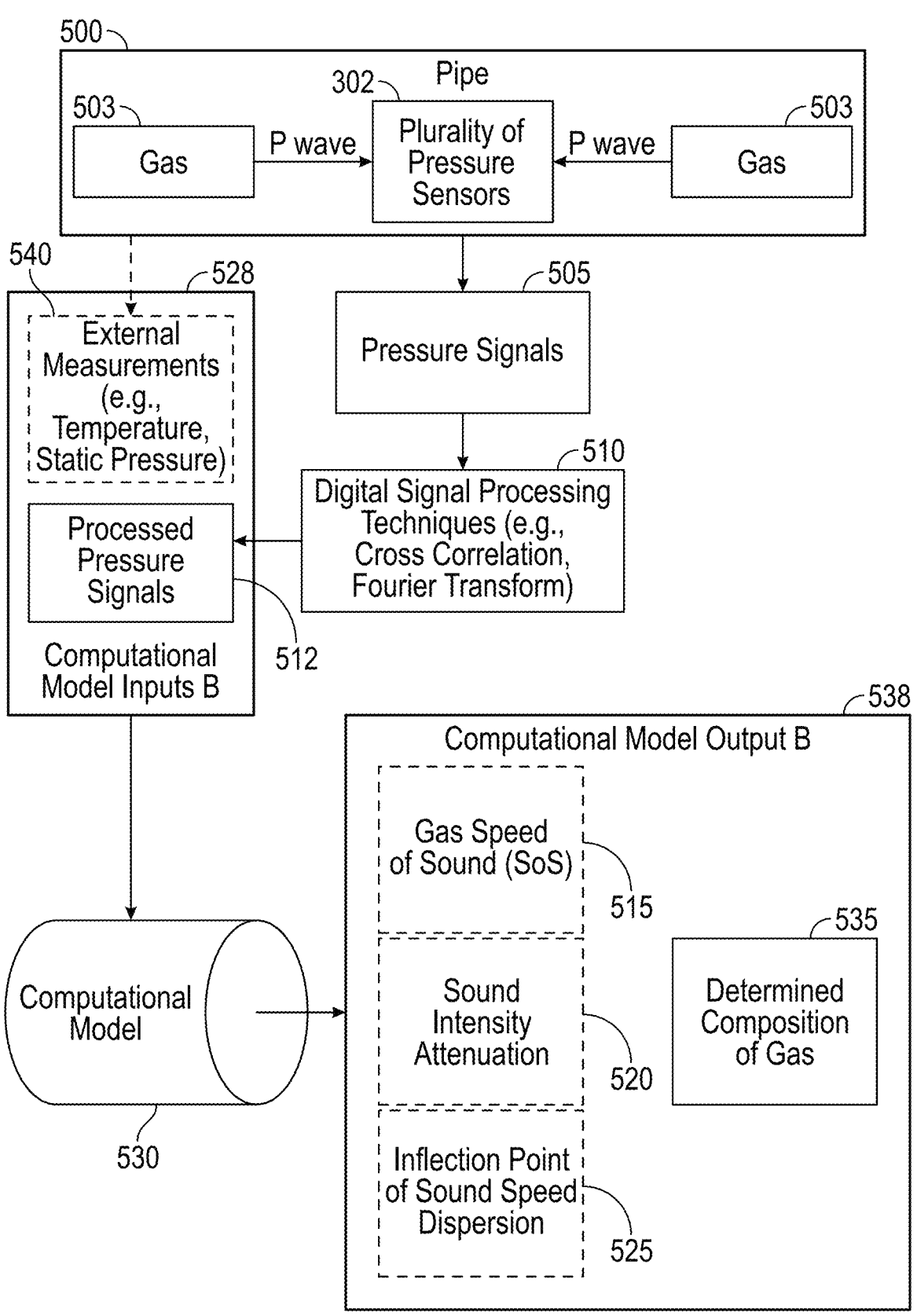
Figure 5C:
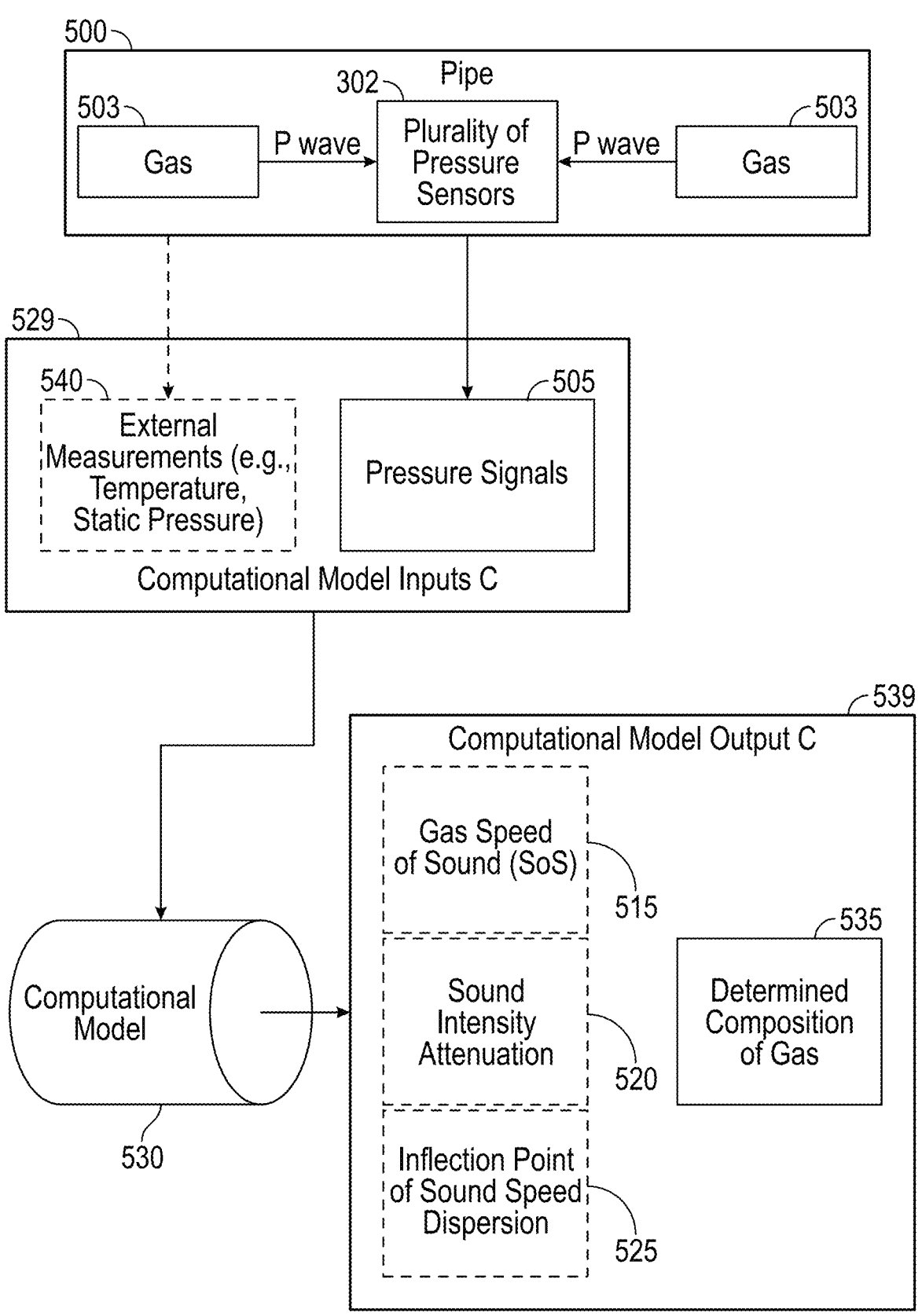

As noted, the objective of the computational model is to determine the composition of the gas mixture in a flowing conduit, such as a pipe, using a plurality of pressure signals as measured by the plurality of pressure sensors disposed along the flowing conduit as described above. FIGS. 5A-5C depict the input and output structure of the computational model used for determining the composition of the gas mixture, in accordance with one or more embodiments. More specifically, FIGS. 5A-5C depict the interactions between a pipe as part of a pipeline, a plurality of pressure signals, and the computational model that is used to determine the composition of the gas. FIGS. 5A-5C shares common elements with FIG. 1 though they need not be identical. As such, similar elements may be present but are given distinct labels for convenience.

FIGS. 5A-5C include a pipe (500) as part of a pipeline or grid (not shown) (e.g., gas processing plant (200)). In one or more embodiments, a pipe may generically refer to a fluid and gas carrying conduit or an isolated structure capable of containing gas. Within the pipe (500), a gas (503), which may or may not be flowing, interacts with a plurality of pressure sensors (302) through oscillations in pressure or pressure waves (indicated by "P wave"). The plurality of pressure sensors (302) may measure turbulent pressure fluctuations if the gas (503) is flowing. If the gas is not flowing, the plurality of pressure sensors (302) may measure compressional acoustic waves caused by an acoustic source in the pipe (500). The gas (503) may contain a plurality of individual gases that are present in different amounts relative to each other (for example, at different levels of concentration), such as a mixture of including methane, ethane, and propane, and others not listed. In some instances, hydrogen may also be included by the gas mixture. The gas may alternatively be dominated by a single gas with some impurities (e.g., a hydrogen-rich gas mixture where hydrogen comprises ≥95% of the gas, ≥90% of the gas, or ≥85%). The plurality of pressure sensors (302) of FIGS. 5A-5C are assumed to share the same properties as the plurality sensors described in reference to FIGS. 1-4. Further, it is assumed that the axial spacing and angular spacing of the pressure sensors in the plurality of pressure sensors are known. That is, at the very least, the relative locations of the pressure sensors on the fluid-carrying conduit are known. Each pressure sensor in the plurality of pressure sensors (302) outputs a pressure signal which may be considered a series of pressure values in time. Because there is a pressure signal for each pressure sensor in the plurality of pressure sensors (302) it may be said that there is a plurality of pressure signals (505) without undue ambiguity.

The information needed to determine the composition of the gas mixture is embedded within (or encoded by) the plurality of pressure signals (505). With this in mind, a computational model (530) is used to determine the composition of the gas mixture based on particular computational model inputs related to the plurality of pressure signals (505). However, the computational model inputs include several possible elements and may differ across one or more embodiments without limitation to the present disclosure. The input structure of FIG. 5A, as will be explained below, builds upon intuitions and insight derived from acoustic physics that will be familiar to a person of ordinary skill in the art. In other words, the input structure depicted in FIG. 5A represents one or more embodiments and is expected to be useful in motivating a range of additional possible embodiments while also promoting general understanding.

As shown in FIG. 5A, the plurality of pressure signals (505) is analyzed with digital signal processing techniques (510), becoming processed pressure signals (512). In one or more embodiments, the digital signal processing techniques (510) include a cross-correlation scheme of the plurality of pressure signals (505). In brief, cross-correlation may be used to compare the plurality of pressure signals (505) amongst each other and thereby determine both the speed of sound of the gas (503) as well as its bulk flow velocity. This is possible because the position of each sensor in the plurality of pressure sensors (302) is known and because the plurality of pressure signals (505) include measurements of changes in pressure across time. Further detail regarding cross-correlation is given below.

To promote understanding, a basic introduction to cross-correlation applied to two signals is provided herein. One with ordinary skill in the art will recognize that many adaptations to cross-correlation schemes are known and that the provided example should not be considered limiting. Turning to FIG. 6A, FIG. 6A depicts two signals; namely, a first signal (602) and a second signal (604). Both signals are discrete time-series and represent a recorded amplitude with respect to time. The first signal (602) is represented as a time-based function, $f(t)$. Likewise, the second signal (604) is represented as a time-based function, $g(t)$. For the present example, it is assumed that the signals, being discrete, are sampled according to the same sampling frequency (e.g., the sampling frequency of the pressure transducers). Given a uniform sampling frequency, the sampled points in the signals are separated in time by a time spacing, $\Delta t$. Thus, under the time-based function notation, the signals may be represented according to an index, u, without ambiguity. That is, using the first signal (602) as an example, $f(t)=f$ ($u \cdot \Delta t$) and because the time spacing, $\Delta t$, is a constant, the first signal (602) may be represented simply using the index u as $f(u)$ without confusion. Further, as shown in FIG. 6A, both the first signal (602) and the second signal (604) record an event (606). An event (606) is a fluctuation in the amplitude of a signal that is notably larger than the random noise present in the signal. The event (606) shown in FIG. 6A is depicted as a sinc-like function, however, in practice, a recorded event (606) can have any form. As seen in FIG. 6A, the event (606) occurs in both the first signal (602) and the second signal (604) but at different points in time. The time separation (610) between the event is depicted by a double-sided arrow in FIG. 6A.

An arbitrary time shift may be applied to one or more of the signals. In FIG. 6B, the second signal (602) is shifted in time by a secondary index, v. As seen in FIG. 6B, for some value v the first signal (602) and the second signal (604) become essentially aligned in time. It may be said that when appropriately shifted such that the signals are aligned, the signals are similar. Cross-correlation, in basic terms, in a measure of similarity between two signals when a time shift is applied to one of them.

In many practical applications, it is useful to determine the time separation (610) of an event (606) between two signals. In other words, it is useful to determine the shift, in time, required in one signal to align it with the other. Thus, cross-correlation can be applied to measure the similarity between two signals while one of the signals experiences many shifts. The shift that results in the greatest similarity between the two signals is indicative of the time separation (610) between events (606) recorded by the signals.

For discrete signals, the cross-correlation of two signals is given by:

$$CC(u) = (f * g)(u) = \sum_{v=-\infty}^{\infty} f(v)g(v+u), \qquad (1)$$

where CC is the cross-correlation value at an index (or time) of v. FIG. 6C depicts the cross-correlation values, as a function of time (or the index u) for the first signal (602) and the second signal (604) according to EQ. 1 (where the second signal (604) is shifted relative to the first signal (602)). As seen, the cross-correlation has a maximum value (612). The maximum value corresponds with a time shift of about-12 seconds. Thus, in the example shown in FIGS. 6A-6C, the time separation between signals is determined to be about 12 seconds.

Under the context of the instant disclosure, the first signal (602) and the second signal (604) may be pressure signals (505) indicating the pressure sensed by their associated pressure sensors (302) with respect to time. In this case, the event (606) may be a pressure event. For a flowing fluid (where "fluid" here refers to flowing substances generally operating according to fluid mechanics, including both liquids and gases) the pressure event may be caused by the passing of a flow eddie or a sound wave. Generally, these different types of events occur on very different temporal scales. A flow eddie nominally travels at the same speed as the bulk flow. A sound wave travels at the speed of sound for the fluid (i.e., speed of sound for multi-phase fluids and multi-component gases) plus or minus the bulk flow velocity relative to the sound wave. That is, if the sound wave is travelling in the direction of the fluid flow, then its observed velocity is $$V_{sw} = SoS + V_{bulk} \qquad (2)$$

and if the sound wave is travelling in the direction opposite of the fluid then its observed velocity is $$V_{sw} = SoS - V_{bulk}. \qquad (3)$$

In EQs. 2 and 3, $V_{bulk}$ is the bulk velocity of the fluid, SOS is the speed of sound (the velocity at which a sound wave travels in the fluid when the fluid is at rest), $V_{sw}$ is the velocity of the sound wave observed from the fixed frame of reference established by the pressure sensors (i.e., Eulerian viewpoint). A sound wave may originate from any number of flow-induced sources and, in general, may travel with or against the flow of the fluid. Using a cross-correlation scheme, the time between pressure events, whether the pressure event is related to a flow eddie or a sound wave, may be determined. In practice, classifying a pressure event as either a flow eddie or a sound wave is relatively simple due to the fact that these operate on two different time scales and because sound waves may propagate bidirectionally relative to the movement of the fluid.

Using the simplified case of only two pressure sensors as an example, a cross-correlation scheme, such as that shown in EQ. 1, can be applied to the associated signals to determine the time separation of one or more pressure events. Assuming that the spatial separation between sensors is also known, the time separation and the spatial separation can be used to calculate the velocity of a pressure event. As an example, consider an event that has been detected by two pressure sensors, where the pressure sensors are separated by a known axial spacing of $x_s$. Using a cross-correlation scheme, the time separation of the event is determined to be $t_s$. For the present example, it stated that $t_s$ is found to be relatively long such that the pressure event is determined to be caused by a flow eddie. The time separation of this pressure event is presented as $t_{fe}$ to emphasize that the time separation corresponds with a flow eddie pressure event. In this simple case, the velocity of the flow eddie pressure event is calculated as $v_{flow\ eddie}=x_s/t_{fe}$. Because flow eddies are known to travel at similar speed to the bulk flow, the bulk velocity of the fluid is also the velocity of the flow eddie pressure event (i.e., $v_{bulk}=v_{flow\ eddie}$). Thus, the bulk velocity of a fluid may be determined. Similarly, if a pressure event is identified as a sound wave and its time separation is determined using cross-correlation as $t_{sw}$ (where the subscript sw emphasizes that the pressure event is caused by a sound wave), then the observed velocity of the sound wave is $v_{sw}=x_s/t_{sw}$. With knowledge of the fluid bulk velocity and the velocity of a sound wave propagating in the fluid, the speed of sound may be determined using either EQ. 2 or EQ. 3. In cases where fluid is not flowing, there is no bulk velocity, and thus no need to account for its contribution to the measured signals.

It is noted that the above example using the cross-correlation scheme of EQ. 1 and two pressure sensors with known spacing is purposefully simple to promote understanding. In practice, more than two pressure sensors may be used. Further, many alterations, adaptations, and improvements to the cross-correlation scheme of EQ. 1 may be used. One with ordinary skill in the art will recognize that the cross-correlation scheme may be readily adapted and applied to more than two signals simultaneously. In one or more embodiments, the cross-correlation scheme may be time-varying such that substantially instantaneous measurements of the time separation of events may be determined. Further, the cross-correlation scheme may distinguish between, or be used, when multiple overlapping events are present in the recorded signals. In general, due to noise and other signal fluctuations, recorded signals may not be in alignment even with a correct time shift applied. In one or more embodiments, the cross-correlation scheme may aggregate results. Having applied the cross-correlation scheme (as part of the digital signal processing techniques (510)) to the plurality of pressure signals (505), the plurality of pressure signals (505) become processed pressure signals (512). In the simplified illustration above, we have demonstrated how at least the gas speed of sound (515) may be derived from the processed pressure signals (512).

Returning to FIG. 5A, in one or more embodiments, the digital signal processing techniques (510) may include a Fourier transform of the pressure signals (505). Generally, the objective of Fourier analysis is to investigate the content of mathematical functions of one domain (commonly time or space) in the domain of frequency. The Fourier transform has a number of useful properties and can expedite certain mathematical operations by moving functions or signals into the frequency domain, as will be described below. Put simply, the Fourier transform quantifies the amount of energy present in a given signal across all frequencies by representing the signal as a combination of sinusoidal functions. While it is beyond the scope of the instant disclosure to describe the origin and development of Fourier analysis, consider the definition of the discrete Fourier transform:

$$X(k) = \frac{1}{N}\sum_{n=0}^{N-1} x(n)e^{-i\frac{2\pi k}{N}n} \tag{4}$$

where $X(k)$ is the discrete Fourier transform of the periodic sequence $x(n)$, and N is the number of samples in the discrete signal, k is an integer, and i is the imaginary unit number (i.e., the square root of negative 1).

There are at least two motivations for using a Fourier transform as part of the digital signal processing techniques (510) of the pressure signals (505). First, calculating the cross-correlation of two functions is generally a far more complicated and computationally intensive procedure than presented in FIGS. 5A-5C and the supporting text, and the Fourier transform can expedite this process. Recall the definition of the cross-correlation of two functions provided by EQ. 1. The definition of the convolution of two discrete signals is given by:

$$Conv(u) = (f * g)(u) = \sum_{v=-\infty}^{\infty} f(v)g(u - v), \tag{5}$$

where Conv(u) is the convolution value at an index (or time) of v. By comparing EQ. 1 and EQ. 5, it is clear that convolution is identical to cross-correlation except one of the two signals is reversed according to its index. In this way, convolution and cross-correlation may be considered interchangeable, under suitable conditions (e.g., by applying a time reversal of the function). Those skilled in the art will appreciate the "convolution theorem," which states that the Fourier transform of a convolution of two signals is equal to the product of the Fourier transforms of each signal. In other words, the convolution of two signals can be determined by finding the Fourier transform of each signal, multiplying the Fourier-transformed signals, and finding the inverse Fourier transform of the product. Further, those skilled in the art will appreciate that time reversal in the time domain is equal to complex conjugation in the frequency (or Fourier) domain. Interchanging convolution with cross-correlation, one may therefore equivalently write the convolution theorem as stating that the Fourier transform of a cross-correlation of two functions, where one function has been reversed according to its time index, is equal to the product of the Fourier transform of one function and the complex conjugation of the Fourier transform of the function that has been reversed. To state differently, the cross-correlation of a first and a second signal can be determined by time-reversing the second signal, finding the Fourier transform of each signal, obtaining the complex conjugate of the second (time-reversed) Fourier-transformed signal, multiplying the Fourier-transformed first signal with the complex conjugate of the Fourier-transformed second signal, and finding the inverse Fourier transform of the product.

In one aspect, the involvement of Fourier transforms may be considered unnecessarily computationally intensive compared to simply calculating the cross-correlation directly. For continuous signals, this may be true, but in practice, digital signals are almost always discrete, or may be treated as discrete by considering only a particular portion of the signal. Many algorithms have been developed to improve the computational efficiency of calculating discrete Fourier transformations for discrete signals. It is beyond the scope of this disclosure to derive the class of algorithms known as "fast" Fourier transforms (or FFTs), however. In short, FFTs exploit the symmetry and periodicity of the discrete Fourier transform, reusing the results of previous computations, to drastically reduce the number of required mathematical or computational operations, sometimes referred to as computational time complexity. Crucially, FFTs are able to achieve computational time complexity of order O(N log N). Here, we have used the shorthand of "Big O" notation to indicate that FFTs require "of order" (or approximately, to within a factor of 10) N times log N computations, where N is the length or number of elements of one of the signals and "log" is the transcendental operation of the logarithm. By contrast, the computational time complexity of calculating a discrete cross-correlation is $O(N^2)$ because the cross-correlation requires calculating at least $N^2$ multiplications and $N^2$ additions. Therefore, the digital signal processing techniques may employ a Fourier transform (specifically, an FFT) in order to rapidly calculate cross-correlations.

The second motivation for employing Fourier transforms in the digital signal processing techniques (510) does not involve cross-correlation but instead relates to obtaining further information from the plurality of pressure signals (505) in their raw form. The plurality of pressure signals (505), in one or more embodiments, are measured over a period of time. Thus, the plurality of pressure signals (505) may be constructed as mathematical functions of either time or space (or both time and space), relating when (in time) the pressure signals occur and at what location (assuming the location of each pressure sensor in the plurality of pressure sensors (302) is known). By transforming these quantities to the domain of frequency via a Fourier transform (or FFT), the repertoire of mathematical techniques developed for acoustic physics, spectral analysis (analysis of signals as a function of frequency, or sometimes wavelength), and manipulating sinusoidal functions generally, may be employed to further extract information related to the gas (503). For example, changes in pressure in a finite medium result in the creation of oscillating waves (i.e., Lamb waves) with various modes or frequencies. A natural approach to studying the plurality of pressure signals (505) as measured by the plurality of pressure sensors (302) within the pipe (500) is thus to transform the signals to the frequency domain, which is mathematically structured to describe oscillating waves. Further, the motion of the pressure waves traveling through a given medium is dependent on the properties of the medium itself. Therefore, the properties of the medium may be inferred through analysis of the pressure waves.

Figure 7A:
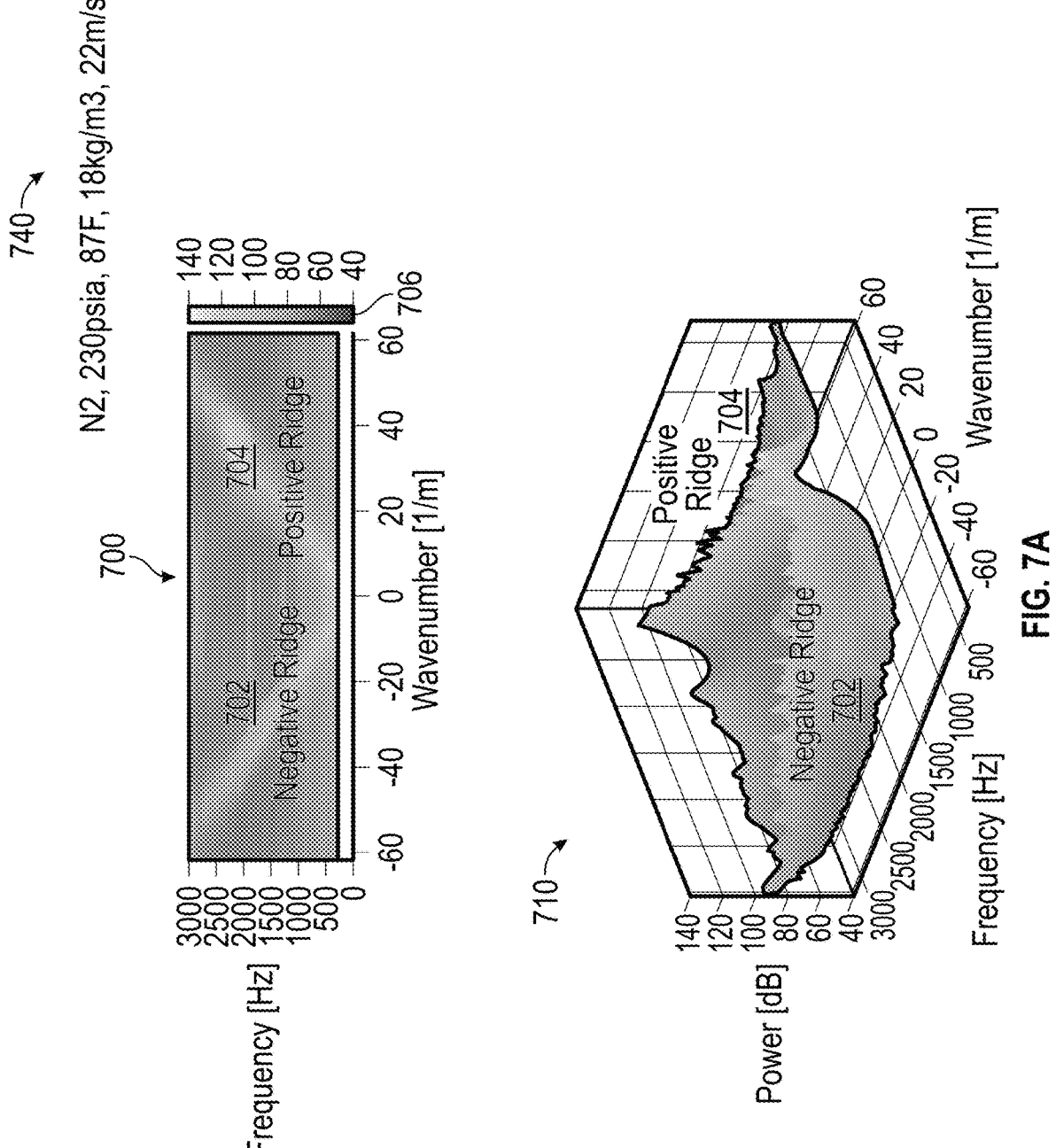
FIGS. 7A and 7B depict f-k diagrams in accordance with one or more embodiments.
Figure 7A:
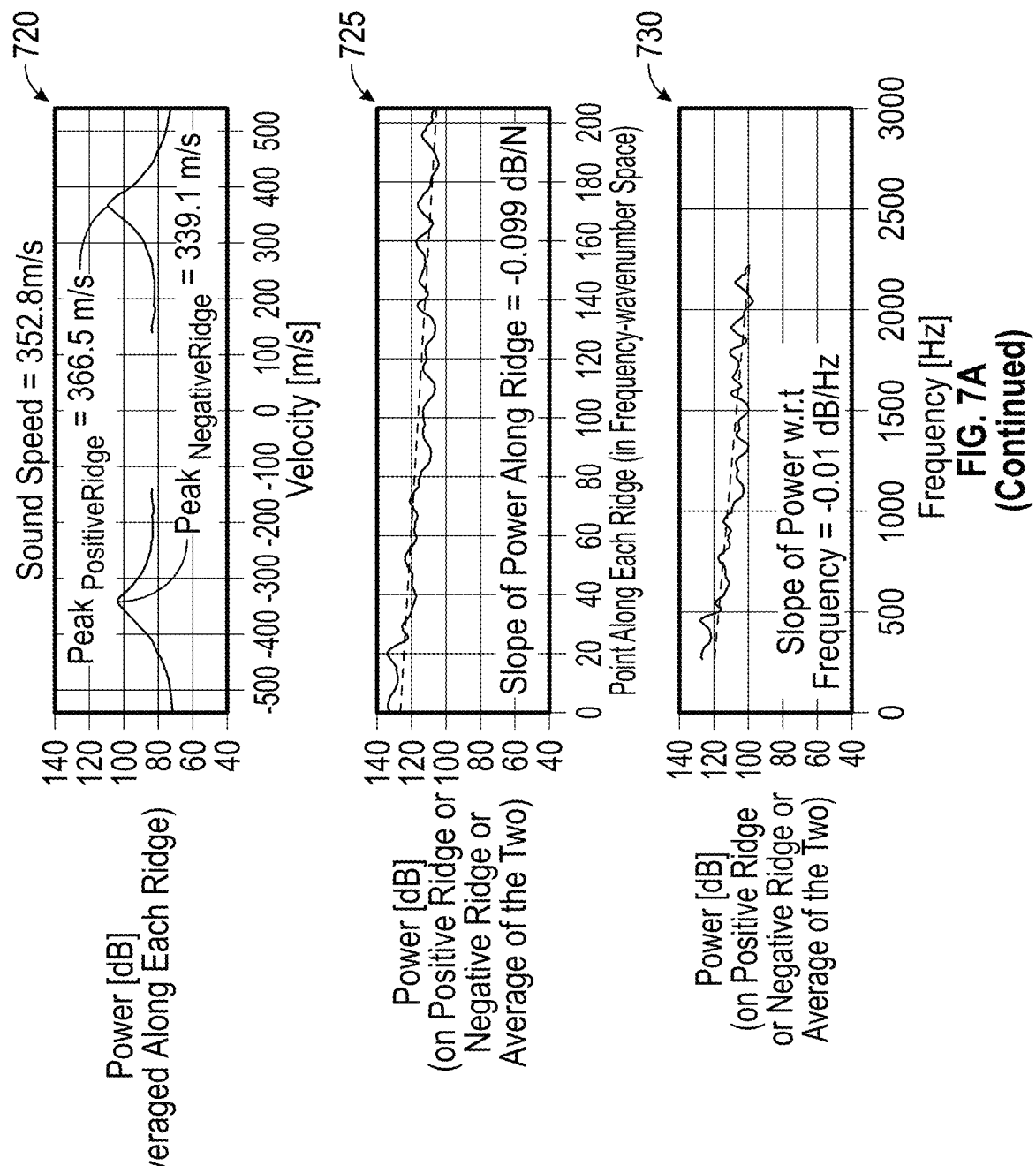
Figure 7B:
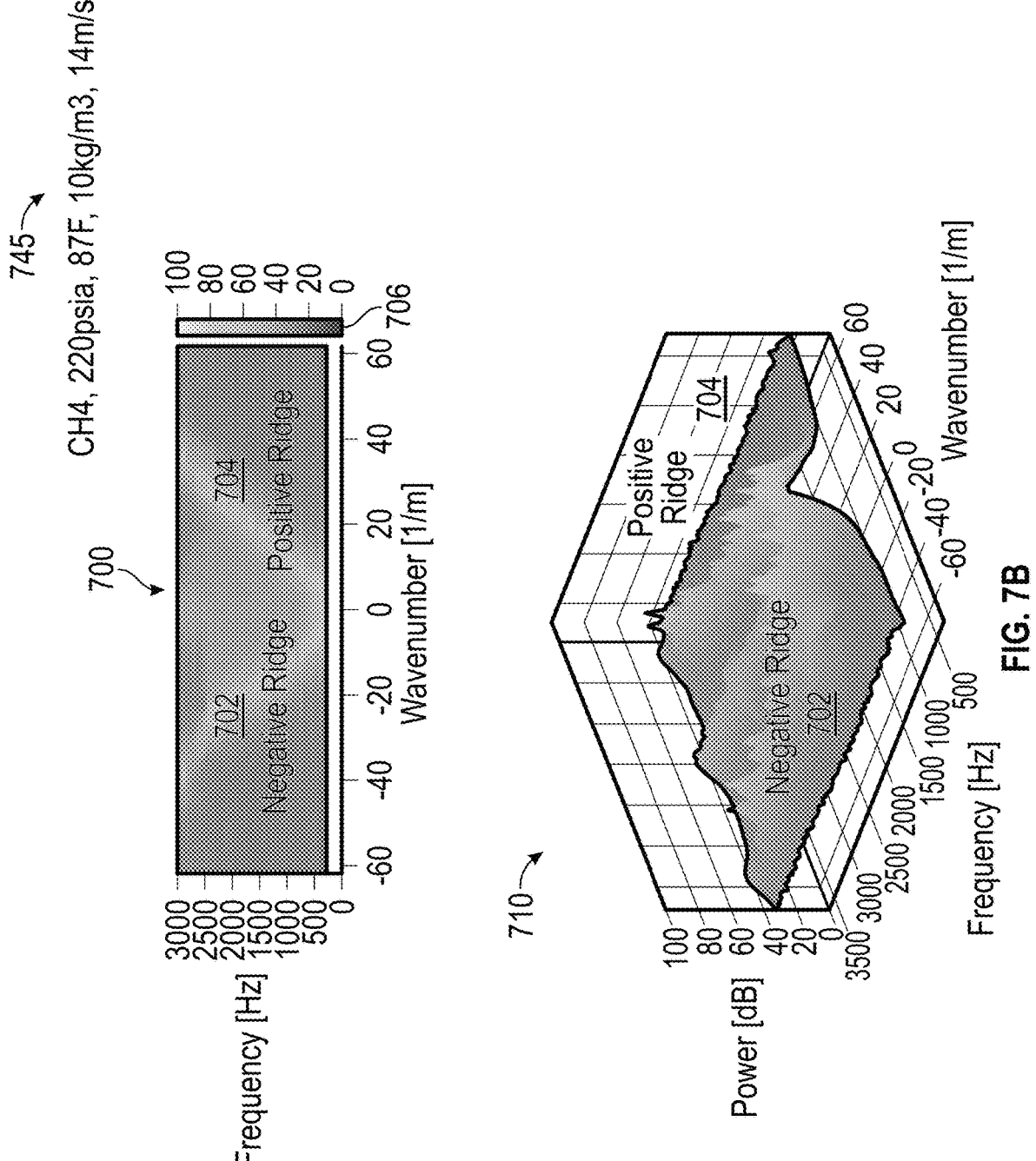
Figure 7B:
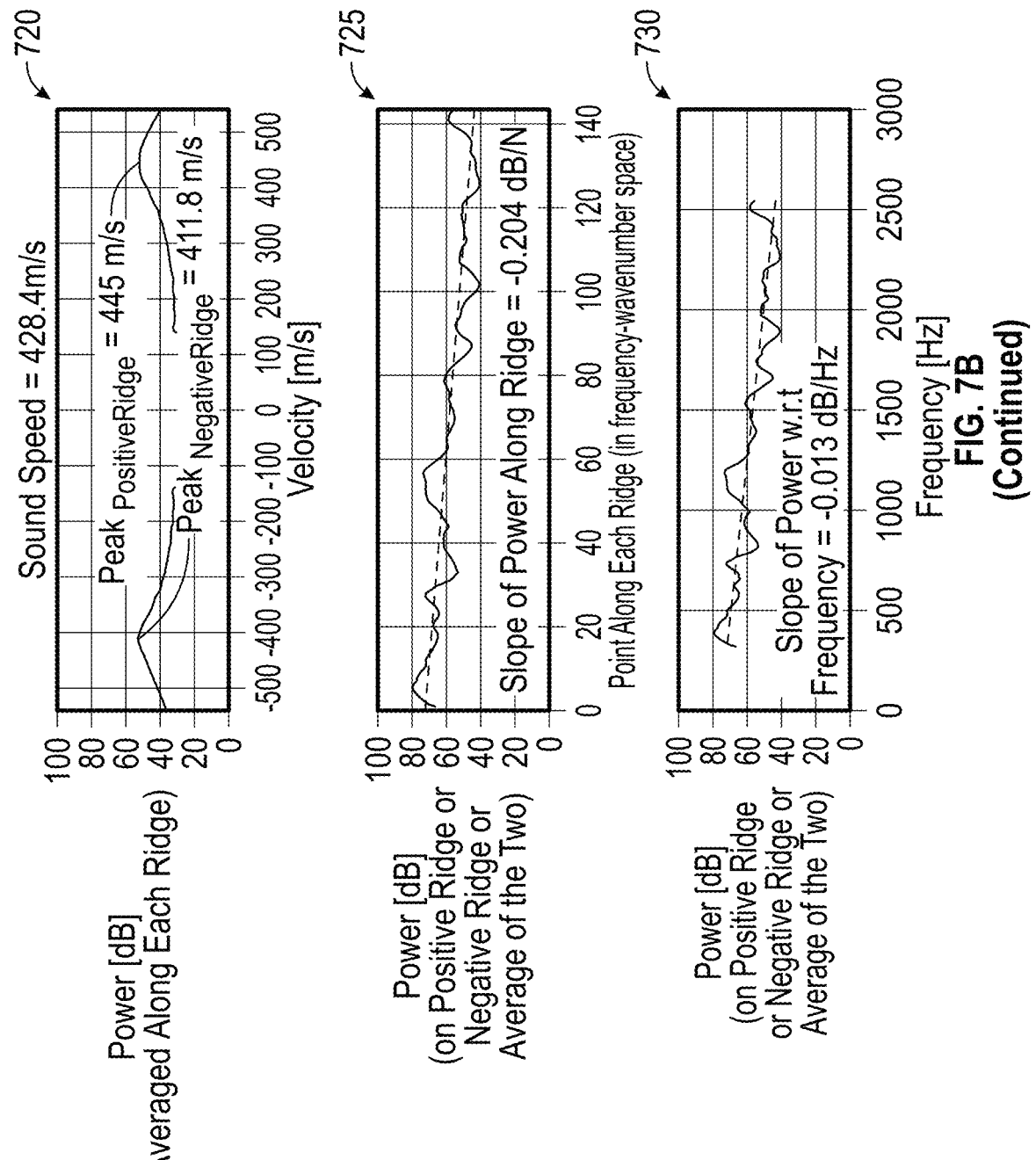

In one or more embodiments, the digital signal processing techniques (510), as applied to the pressure signals (505), includes a two-dimensional Fourier transform (or FFT) of the signals. The two-dimensional Fourier transform (e.g., 2D FFT) is applied to transform the signals from signals, with respect to time, to the frequency (f) domain and to transform the signals, with respect to distance or spatial position, to the wavenumber (k) domain. In seismology and acoustic physics, this type of transformation may be referred to as an "f-k" transformation. Having been manipulated by the two-dimensional Fourier transform (e.g., 2D FFT), the plurality of pressure signals (505) may be considered processed pressure signals (512). A significant amount of information related to the medium through which the pressure waves travel is present within the processed pressure signals (512) in the f-k domain, subject to the quality of the measurements (e.g., signal-to-noise (STN), where STN is expected to be improved using the apparatus described with respect to FIGS. 3A-3B and FIG. 4). One way to represent the processed pressure signals (512) in the f-k domain is to create two or three-dimensional "f-k diagram" where the horizontal axis indicates wavenumber, and the vertical axis indicates frequency. Amplitude (or power, proportional to the square of the amplitude) may be represented either by a color scale or by shading of the data in the f-k plane. In some cases, the relationship between frequency and wavenumber may be referred to as a "dispersion relation." Alternatively, power may be projected along an axis perpendicular to the f-k plane to create a three-dimensional perspective. An example of two f-k diagrams is given in FIGS. 7A and 7B alongside additional derived graphs (discussed below). In accordance with one or more embodiments, both FIGS. 7A and 7B depict f-k diagrams for processed pressure signals (512) pertaining to a plurality of pressure signals, where the plurality of pressure signals is substantially similar to the plurality of pressure signals (505) discussed above. In other words, the plurality of pressure signals have been measured in a pipe (or similar fluid conduit) using a plurality of pressure sensors (302) and processed using digital signal processing techniques (510) similar to those discussed above. Both FIGS. 7A and 7B show similar diagrams and measurements that differ only due to the composition of the gas under consideration. As such, discussion of like-elements present in both FIG. 7A and FIG. 7B apply to each figure.

In FIG. 7A, a flowing gas is predominantly composed of gaseous nitrogen according to a first set of gas properties (740). The first set of gas properties (740) indicates that the gas is nitrogen (N2) with an average pressure of 230 psia, an average temperature of 87 F, a density of 18 kg/m$^3$, and bulk flowing velocity of 22 m/s. In FIG. 7B, a gas is predominantly composed of methane according to a second set of gas properties (745). The second set of gas properties (745) indicates that the gas is methane (CH4) with an average pressure of 220 psia, an average temperature of 87 F, a density of 10 kg/m$^3$, and a bulk flowing velocity of 14 m/s.

A two-dimensional f-k diagram (700) of the processed pressure signals in the f-k plane for the flowing gas is shown, where power is indicated by the shading of the data according to the greyscale (706). The data are also presented in a three-dimensional f-k diagram (710), where power has been projected along an axis perpendicular to the f-k plane. The data in the three-dimensional f-k diagram (710) are shaded in the same manner as in the two-dimensional f-k diagram (700) for consistency. Present in both the first two-dimensional f-k diagram (700) and the first three-dimensional f-k diagram (710) are "power ridges" or areas of increased power at particular frequencies and wavenumbers. More specifically, there is a negative power ridge (702) and a positive power ridge (704). The negative power ridge (702) is a reflection of the positive power ridge (704) caused my oscillations traveling in the opposite direction. The properties of the flowing medium (including the composition of the flowing medium, i.e., the types of gas present and their respective concentrations) affect the shape of the power ridges. For example, the properties of the medium through which the pressure waves propagate impact the orientation of the power ridges in the f-k plane, the slope of the power ridges or spectral signature (or the partial derivative of power with respect to one or more variables), and the peak power. The peak power in an f-k diagram is indicative of the speed of sound; the slope of the power ridges or spectral signature is indicative of the relative sound intensity attenuation, or how the power of a sound wave changes over frequency or wavenumber; and whether the power ridge "bends" or departs from a linear relation between frequency and wavenumber indicates an inflection point in the sound speed dispersion relation or a change in the relationship between velocity and frequency. Each of these features are elaborated upon below.

The vertical axis of the f-k diagram (700, 710) represents frequency, which has units of Hz (cycles per second), and the horizontal axis represents wave number, which has units of 1/m (inverse distance). Accordingly, a given location in the f-k plane relates to a velocity (after accounting for an additional factor of 2π). By averaging the velocity along each power ridge (e.g., along the positive power ridge (704) and along the negative power ridge (702)), the speed of sound within the medium can be determined. In FIG. 7A, a graph of power averaged over each ridge (720), as a function of velocity, reveals peaks corresponding to 339.1 m/s for the negative ridge (702) and 366.5 m/s for the positive ridge (704). Averaging the two measured values gives a speed of sound of 352.8 m/s. Turning to FIG. 7B, a graph of power averaged over each ridge (720), as a function of velocity, reveals peaks corresponding to 411.8 m/s for the negative ridge (702) and 445 m/s for the positive ridge (704). Averaging the two measured values gives a speed of sound of 428.4 m/s. As predicted by theory, the measured speed of the sound in the two different gases (nitrogen in FIG. 7A, methane in FIG. 7B) clearly differs. Accordingly, the speed of sound of the gas may be used to infer the composition of the gas as the speed of sound is considered characteristic of (though not necessarily unique to) the gas composition.

Turning to the slope of the power ridges (as a simple/ illustrative metric for the power spectral signature) and the relative sound intensity attenuation, either the positive power ridge (704) may be considered, or the negative power ridge (702) may be considered. Alternatively, the average slope across both the first positive power ridge (704) and the first negative power ridge (704) may be considered. Whether the first negative power ridge (702) is considered, the first positive power ridge is considered (704), or both (via an average of the two), the slope of power may be measured along the ridge (in the frequency-wavenumber plane), with respect to frequency alone. In other words, the slope of the power ridge may be measured as a partial derivative of power with respect to one or more variables. By definition, the slope of the power ridge (and the partial derivative of power) indicates how the power changes with respect to one or more variables. In general, the power is attenuated, or is decreased, by one or more factors when measured along the power ridge or with respect to frequency and beginning at the origin (frequency, wavenumber=0, 0). Sound energy, in the form of propagating pressure waves, is absorbed by the medium (and converted into heat) via viscosity and thermal conduction and also undergoes diffusion and molecular relaxation; each of these effects are dependent on the medium through which the pressure oscillations travel. Measurements of the slope of the power ridge (702, 704) are presented as measured along the ridge in frequency-wavenumber space (725) and with respect to frequency alone (730). Depending on how the slope is measured (or which variable the partial derivative of power is calculated with respect to), the slope may differ. For example, in FIG. 7A the slope of the power ridge measured along the ridge in frequency wavenumber space (725) is –0.099 dB/N, while the slope of the power ridge measured with respect to frequency alone (730) is –0.01 dB/Hz. Turning to FIG. 7B, the slope of the power ridge measured along the ridge in frequency-wavenumber space (725) is –0.204 dB/N, while the slope of the power ridge measured with respect to frequency alone (730) is –0.013 dB/Hz. Regardless of how the slope of the power ridge is measured, the sound intensity attenuation is characteristic of (though not necessarily unique to) the medium through which the pressure waves propagate, as previously stated, and as indicated by the different measurements presented in FIGS. 7A and 7B. Accordingly, the sound intensity attenuation may be used to infer the composition of the gas.

Measurement of sound intensity attenuation, including those discussed above, may also be sensitive to the structure containing the medium through which the pressure waves propagate. For example, reflected signals typically present in closed chambers may contribute uncertainty to the shape of the power ridge. The reflected signals may be mitigated by including an absorbing material along the fluid carrying conduit containing the gas. In addition, closed structures typically exhibit resonance frequencies, which may further affect the shape of the power ridge by diverting signal to local maxima in the f-k plane related to the resonant frequency of the system. Resonance frequencies may be avoided through consideration of the size and shape of the fluid carrying conduit.

Another feature may be discerned in the two-dimensional f-k diagrams (700) and the three-dimensional f-k diagrams (710), namely, an inflection point in the sound speed dispersion. A known feature of acoustic systems is that, depending on the medium through which pressure waves oscillate, the relationship between the speed of sound and the oscillating pressure wave frequency may undergo an abrupt change. This feature is sometimes referred to as an "inflection point" in the sound speed dispersion. If the relationship between speed of sound and frequency were to abruptly change at a given frequency, this feature would manifest in the f-k diagrams by shifting power away from the power ridge (702, 704) and into an adjoining power ridge with a different slope in the f-k plane. Put differently, an inflection point in the sound speed dispersion would create a bend or "knee" in the power ridge (702, 704), where the slope of the power ridge (according to its shape in the f-k plane) changes from one value to another. In the example cases provided by FIGS. 7A and 7B, this feature is not present. Nonetheless, as with the properties of the gas speed of sound and the sound intensity attenuation, the inflection point of the sound speed dispersion is also characteristic of (though not necessarily unique to) the medium through which the pressure waves propagate. Accordingly, the inflection point of the sound speed dispersion may also be used to infer the composition of the gas.

While a few examples of digital signal processing techniques (510) have been discussed herein (e.g., cross-correlation of signal and Fourier transforms), the listed and described digital signal processing techniques should not be considered limiting with regard to the instant disclosure. Further digital signal processing techniques (510) not listed may be used on the plurality of pressure signals (505) to obtain the processed pressure signals (512). For example, the digital signal processing techniques (510) may include wavelet analysis, another type of mathematical analysis in the frequency domain. Alternatively, the pressure signals (505) may be processed with a spectrogram to produce different visual representations of the frequencies present in the pressure signals (505).

As stated above, the properties of the medium through which the pressure waves propagate affect the wave oscillations and how the waves travel generally. Recall that the first set of gas properties (740) and the second set of gas properties (745) include both gas pressure (or static pressure) and temperature, in addition to the gas composition and bulk flow velocity. Inferring the gas composition is generally benefited by knowledge of additional attributes of the gas, such as the average temperature and pressure (also sometimes referred to as the bulk temperature and the bulk pressure). Returning to FIG. 5A, one or more temperature and dedicated static pressure sensors (not shown) are disposed within the pipe (500) in proximity to the plurality of pressure sensors (302), measuring the temperature and pressure within the pipe (500). In other embodiments, one or more of the pressure sensors from the plurality of pressure sensors (302) is used to measure the static pressure and/or the bulk pressure of the flowing gas mixture. In either case, the dedicated pressure and temperature sensors are used to obtain external measurements (540) pertaining to the gas (503) inside of the pipe, where the external measurements may include the gas pressure and gas temperature.

Returning to FIG. 5A, having been processed by one or more digital signal processing techniques (510) involving operations such as cross-correlation or Fourier transformation, the plurality of pressure signals (505) becomes processed pressure signals (512). As has been demonstrated above (e.g., in the discussion of the f-k diagrams shown in FIGS. 7A and 7B), various attributes of the gas (503) gas may be directly determined from the processed pressure signals (512). For example, the gas speed of sound (515), the relative sound intensity attenuation (520), and the inflection point of the sound speed dispersion (525) each may be directly measured from the processed signals. In one or more embodiments, the measurement of one or more of these features (515, 520, 525) may be carried out on a computer system, such as the computer described in FIG. 10 and the supporting text. The measurement may be obtained automatically or at a different time, without limitation. In accordance with one or more embodiments, the collection of measurements, including the external measurements (540), gas speed of sound (515) and relative sound intensity attenuation (520) are gathered and stored as computational model inputs A (527). In one or more embodiments, the inflection point of the sound speed dispersion (525) is also included in the computational model inputs A (527). The computational model inputs A (527) are processed by the computational model (530) producing an output, computational model output A (537), including the composition of the gas (5D35).

In accordance with one or more embodiments, FIG. 5B presents an input and output structure for the computational model (530) used to determine the composition of the gas (503) that is different than the one or more embodiments illustrated by FIG. 5A. As shown in FIG. 5B, the computational model inputs are given by computational model inputs B (528). Computational model inputs B (528) may include the external measurements (540) (e.g., average gas temperature and pressure) and the processed pressure signals (512). The primary difference between embodiments represented by FIG. 5A and FIG. 5B is that the computational model inputs B (528) do not include the measurements derived from the processed pressure signals (512), such as the gas speed of sound (515), relative sound intensity attenuation (520), and the inflection point of the sound speed dispersion (525). The motivation for including the derived measurements (515, 520, 525) as inputs to the computational model (530) in embodiments such as those illustrated by FIG. 5A is that these quantities are known to be characteristic of gas mixtures and their compositions, as discussed above in reference to FIGS. 7A and 7B. However, note that in the one or more embodiments illustrated by FIG. 5A, these derived quantities (515, 520, 525) are inferred (or measured) from the processed pressure signals (512), implying that there may be more information present in the processed pressure signals (512). As such, rather than providing the computational model (530) with only a subset of the information present in the processed pressure signals (512) in the form of derived quantities (515, 520, 525), the computational model (530) may directly accept the processed pressure signals (512) as an input instead. FIG. 5B shows that the computational model inputs B (528) are processed by the computational model (530) producing an output, computational model output B (538), including the composition of the gas (535). In one or more embodiments, the computational model (530) may determine the aforementioned derived measurements, such as the gas speed of sound (515), sound intensity attenuation (520), and inflection point of the sound speed dispersion (525) from the processed pressure signals (512). Accordingly, the computational model output B (538) may also include the gas speed of sound (515), sound intensity attenuation (520), and inflection point of the sound speed dispersion (525), in addition to the composition of the gas (535).

In accordance with one or more embodiments, FIG. 5C presents an input and output structure for the computational model (530) used to determine the composition of the gas (503) that is different than the one or more embodiments illustrated by FIG. 5A and FIG. 5B. As shown in FIG. 5C, the computational model inputs are given by computational model inputs C (529). Computational model inputs C (529) may include the external measurements (540) (e.g., average gas temperature and static pressure) and the plurality of pressure signals (505). The primary difference between embodiments represented by FIG. 5B and FIG. 5C is that the computational model inputs C (529) do not include the measurements derived from the processed pressure signals (512), and they do not include the processed pressure signals (512) either. Instead, computational model inputs C (529) include the plurality of pressure signals (505) without any digital signal processing techniques (510) applied. The motivation for including the processed pressure signals (512) as inputs to the computational model (530) in embodiments such as those illustrated by FIG. 5B is that digital signal processing techniques (510), such as using Fourier transforms to analyze time-series data in the frequency domain (yielding processed pressure signals (512)), are familiar to those of skill in the art and have a long history of use in acoustic physics. However, some computational models, and in particular machine learning models, have been shown to perform well when processing data in its native domain (i.e., without significant manipulation prior to being treated as an input). In computer science, "universal approximation theorems," put simply, suggest that artificial neural networks (a particular class of machine learning models) are capable of approximating a wide variety of mathematical functions (thus the moniker of a "universal approximator"). This powerful feature suggests that a sufficiently trained machine learning model may be able to "learn" to manipulate its inputs in ways included by traditional digital signal processing techniques (510), in addition to learning manipulations not traditionally included in digital signal processing techniques. Alternatively (or in addition), the computational model (530) may include one of the familiar digital signal processing techniques (510), such as a cross-correlation operation or Fourier transform, as an activation function (explained in greater detail below) within one or more neurons in embodiments where the computational model (530) includes an artificial neural network. Therefore, one possibility for organizing the input data for the computational model (530), as shown by computational model inputs C (529), is to provide the plurality of pressure signals directly as an input, without significant manipulation. FIG. 5C shows that the computational model inputs C (529) are processed by the computational model (530) producing an output, computational model output C (539), including the composition of the gas (5D35). In one or more embodiments, the computational model (530) may determine further measurements, such as the gas speed of sound (515), sound intensity attenuation (520), and inflection point of the sound speed dispersion (525) from the pressure signals (512). Accordingly, the computational model output C (539) may also include the gas speed of sound (515), sound intensity attenuation (520), and inflection point of the sound speed dispersion (525), in addition to the composition of the gas (535).

In accordance with one or more embodiments, the computational model inputs (e.g., computational model inputs A (527), computational model inputs B (528), computational model inputs C (529)) may be pre-processed before being processed by the computational model (530). Pre-processing may include activities such as numericalization, filtering and/or smoothing of the data, scaling (e.g., normalization) of the data, feature selection, outlier removal (e.g., z-outlier filtering) and feature engineering. Feature selection includes identifying and selecting a subset of operation data with the greatest discriminative power with respect to determining the composition of the gas (535). For example, in one embodiment, discriminative power may be quantified by calculating the strength of correlation between elements of the computational model inputs (e.g., computational model inputs A (527)) and the predicted quantities (e.g., the composition of the gas (535)). Consequently, in some embodiments, not all of the computational model inputs need be passed to the computational model (530). Feature engineering encompasses combining, or processing, various computational model inputs to create derived quantities. The derived quantities can be processed by the computational model (530). For example, the computational model inputs (e.g., computational model inputs A (527), computational model inputs B (528), computational model inputs C (529)) may be processed by one or more "basis" functions such as a polynomial basis function or a radial basis function. In some embodiments, the computational model inputs are passed to the computational model (530) without pre-processing. In one aspect, the digital signal processing techniques (510), described in reference to one or more embodiments, may be considered a specific implementation of data pre-processing. In addition, explicitly providing measurements such as the gas speed of sound (515) as an computational model input may be considered a type of feature engineering. Many additional pre-processing techniques exist such that one with ordinary skill in the art would not interpret those listed here as a limitation on the present disclosure.

The computational model (530) may be of any type known in the art. As previously stated, the computational model may include empirical look-up tables, or a database of laboratory measurements, of speed of sound and sound intensity attenuation for various gases and flowing conditions. The computational model may also apply one or more mathematical techniques for inference, such as measuring correlations through multivariable polynomial modeling (and modeling according to other mathematical functions), regression, and statistical tests, for example. In accordance with one or more embodiments, the computational model may combine mathematical techniques for inference with the empirical look-up tables to determine the composition of the gas (535), or other computational model outputs (e.g., computational model output A (537), computational model output B (538), computational model output C (539)).

In some embodiments, multiple computational model types and/or architectures may be used to form the computational model (530). Generally, the computational model type with the greatest performance on a set of hold-out data, or based on previous experiments, is selected. Constructing a computational model, in the context of the present invention, involves processing data to develop a functional relationship between the inputs and the outputs (also known as "targets" in the context of training a machine learning model). In accordance with embodiments where the computational model includes a machine learning model, constructing the computational model may include training the machine learning model. The computational model, once constructed (or trained in the case of the machine learning model), may be described as a function relating the inputs (e.g., computational model inputs A (527), computational model inputs B (528), computational model inputs C (529)) and the outputs (e.g., computational model output A (537), computational model output B (538), computational model output C (539)). That is, the computational model may be mathematically represented as outputs=$f$(inputs), such that given an input the computational model (530) may produce one output (e.g., computational model output A (537)). In one or more embodiments, the computational model, upon processing an input, produces multiple outputs (e.g., computational model output B (538), computational model output C (539)).

The following discussion relates to embodiments where the computational model (530) includes a machine learning model. However, a person of ordinary skill the art will recognize that many of the same aspects of training and deploying a machine learning model relate to constructing other types of computational models that do not include a machine learning model. Accordingly, although reference is made to embodiments that include machine learning models, the following discussion is not to be considered limiting to only computational models that include machine learning models.

In accordance with one or more embodiments, the computational model (530) includes a machine learning model. Before deployment, the computational model (530), including the machine learning model (hereafter, the ML model), is trained using previously acquired, or historic, modelling data, in accordance with one or more embodiments. The modelling data is composed of observed and measured (or otherwise estimated or simulated) ML model inputs and associated outputs or targets. The structure of the ML model inputs during training closely resembles the inputs the ML model may encounter during deployment. For example, for a deployment setup similar to the one depicted by FIG. 5A, the ML model training inputs may include substantially similar inputs compared to computational model inputs A (527), including substantially similar external measurements (e.g., pressure and temperature) and attributes derived from processed pressure signals that have undergone digital signal processing techniques (510) (e.g., cross-correlation and Fourier transformation). The same principle applies to other embodiments, such as those represented by FIGS. 5B and 5C. Further, the ML model inputs during training may include derived quantities created after pre-processing, if applied. To reiterate, the ML model inputs are paired with known outputs or targets, including the compositions of various gases and gas mixtures under different conditions (e.g., corresponding to a range of temperatures, static pressures, bulk flow velocities, and combinations of gases and their respective concentrations). In embodiments where the ML model is used to determine attributes of the gas (503) beyond its composition (535), such as the gas speed of sound (515), sound intensity attenuation (520), and inflection point of the sound speed dispersion (525), the ML training targets include known values of the aforementioned quantities. The ML model inputs listed are not to be considered limiting, and additional inputs may be considered in other embodiments without departing from the scope of this disclosure. Further detail regarding ML model training is given below and in FIG. 8 in relation to an artificial neural network.

Figure 8:
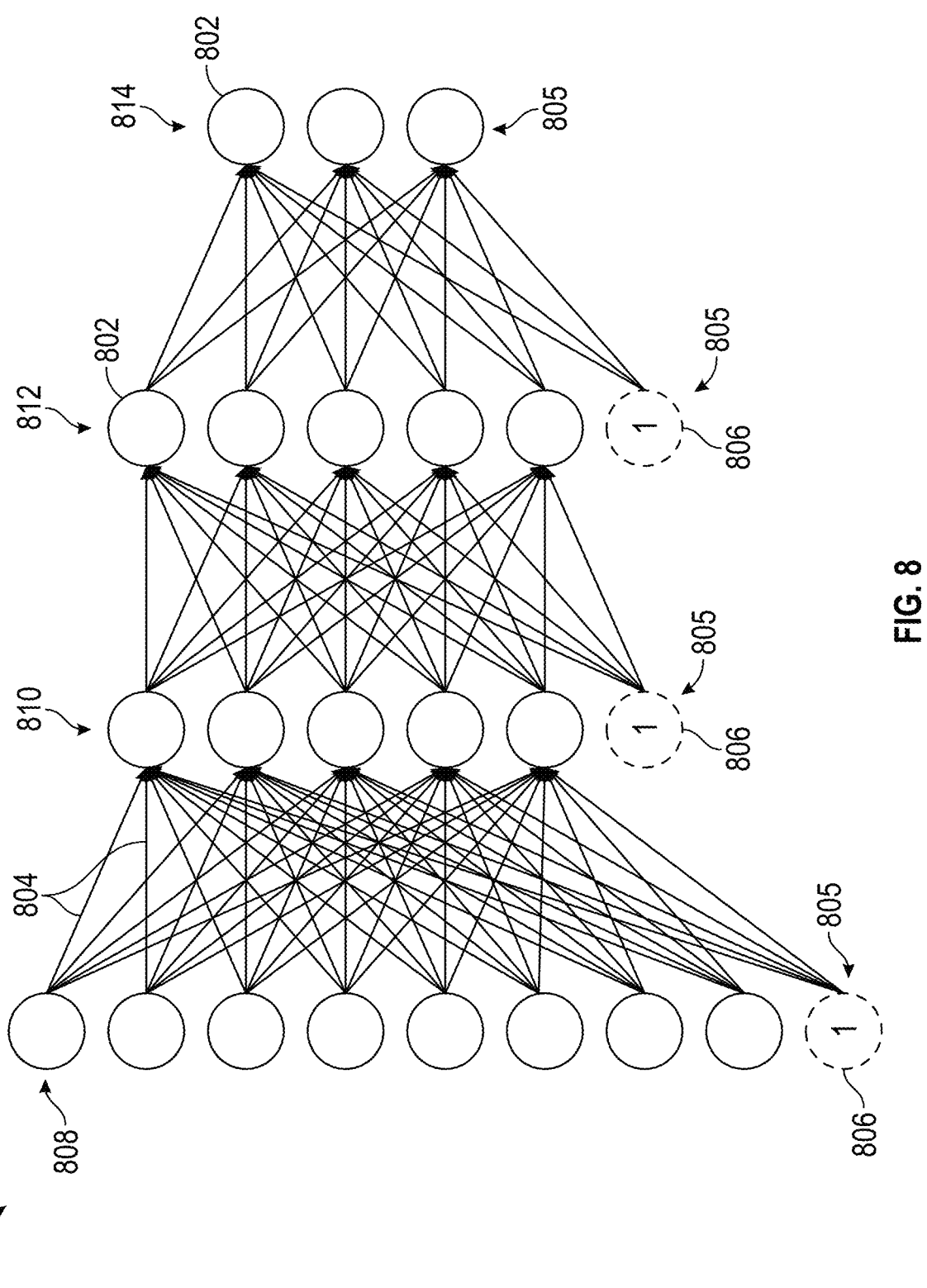
FIG. 8 depicts a neural network in accordance with one or more embodiments.

In accordance with one or more embodiments, the computational model (530) discussed herein may include an artificial neural network ("neural network"). A diagram of a neural network is shown in FIG. 8. At a high level, a neural network (800) may be graphically depicted as being composed of nodes (802), where here any circle represents a node, and edges (804), shown here as directed lines. The nodes (802) may be grouped to form layers (805). FIG. 8 displays four layers (88, 810, 812, 814) of nodes (82) where the nodes (802) are grouped into columns, however, the grouping need not be as shown in FIG. 8. The edges (804) connect the nodes (802). Edges (804) may connect, or not connect, to any node(s) (802) regardless of which layer (805) the node(s) (802) is in. That is, the nodes (802) may be sparsely and residually connected. A neural network (800) will have at least two layers (805), where the first layer (808) is considered the "input layer" and the last layer (814) is the "output layer." Any intermediate layer (810, 812) is usually described as a "hidden layer". A neural network (800) may have zero or more hidden layers (810, 812) and a neural network (800) with at least one hidden layer (810, 812) may be described as a "deep" neural network or as a "deep learning method." In general, a neural network (800) may have more than one node (802) in the output layer (814). In this case the neural network (800) may be referred to as a "multi-target" or "multi-output" network.

Nodes (802) and edges (804) carry additional associations. Namely, every edge is associated with a numerical value. The edge numerical values, or even the edges (804) themselves, are often referred to as "weights" or "parameters." While training a neural network (800), numerical values are assigned to each edge (804). Additionally, every node (802) is associated with a numerical variable and an activation function. Activation functions are not limited to any functional class, but traditionally follow the form:

$$A = f\left(\sum\nolimits_{i \in (incoming)}[(\text{node value})_i(\text{edge value})_i]\right), \quad (6),$$

where i is an index that spans the set of "incoming" nodes (802) and edges (804) and $f$ is a user-defined function. Incoming nodes (802) are those that, when viewed as a graph (as in FIG. 8), have directed arrows that point to the node (802) where the numerical value is being computed. Some functions for $f$ may include the linear function $f(x)=x$, sigmoid function $$f(x) = \frac{1}{1 + e^{-x}},$$

and rectified linear unit function $f(x)=\max(0, x)$, however, many additional functions are commonly employed. Every node (802) in a neural network (800) may have a different associated activation function. Often, as a shorthand, activation functions are described by the function $f$ by which it is composed. That is, an activation function composed of a linear function $f$ may simply be referred to as a linear activation function without undue ambiguity.

When the neural network (800) receives an input, the input is propagated through the network according to the activation functions and incoming node (802) values and edge (804) values to compute a value for each node (802). That is, the numerical value for each node (802) may change for each received input. Occasionally, nodes (802) are assigned fixed numerical values, such as the value of 1, that are not affected by the input or altered according to edge (804) values and activation functions. Fixed nodes (802) are often referred to as "biases" or "bias nodes" (806), displayed in FIG. 8 with a dashed circle.

In some implementations, the neural network (800) may contain specialized layers (805), such as a normalization layer, or additional connection procedures, like concatenation. One skilled in the art will appreciate that these alterations do not exceed the scope of this disclosure.

As noted, the training procedure for the neural network (800) comprises assigning values to the edges (804). To begin training the edges (804) are assigned initial values. These values may be assigned randomly, assigned according to a prescribed distribution, assigned manually, or by some other assignment mechanism. Once edge (804) values have been initialized, the neural network (800) may act as a function, such that it may receive inputs and produce an output. As such, at least one input is propagated through the neural network (800) to produce an output. Recall, that a given data set will be composed of inputs and associated target(s), where the target(s) represent the "ground truth," or the otherwise desired output. In accordance with one or more embodiments, the input of the neural network is the plurality of pressure signals (which may be pre-processed), and external measurements (such as pressure and average temperature) while the target is the composition of the gas mixture (given, for example, as a list of individual gases and their respective concentrations).

The neural network (800) output is compared to the associated input data target(s). The comparison of the neural network (800) output to the target(s) is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (800) output and the associated target(s). The loss function may also be constructed to impose additional constraints on the values assumed by the edges (804), for example, by adding a penalty term, which may be physics-based, or a regularization term. Generally, the goal of a training procedure is to alter the edge (804) values to promote similarity between the neural network (800) output and associated target(s) over the data set. Thus, the loss function is used to guide changes made to the edge (804) values, typically through a process called "backpropagation."

While a full review of the backpropagation process exceeds the scope of this disclosure, a brief summary is provided. Backpropagation consists of computing the gradient of the loss function over the edge (804) values. The gradient indicates the direction of change in the edge (804) values that results in the greatest change to the loss function. Because the gradient is local to the current edge (804) values, the edge (804) values are typically updated by a "step" in the direction indicated by the gradient. The step size is often referred to as the "learning rate" and need not remain fixed during the training process. Additionally, the step size and direction may be informed by previously seen edge (804) values or previously computed gradients. Such methods for determining the step direction are usually referred to as "momentum" based methods.

Once the edge (804) values have been updated, or altered from their initial values, through a backpropagation step, the neural network (800) will likely produce different outputs. Thus, the procedure of propagating at least one input through the neural network (800), comparing the neural network (800) output with the associated target(s) with a loss function, computing the gradient of the loss function with respect to the edge (804) values, and updating the edge (804) values with a step guided by the gradient, is repeated until a termination criterion is reached. Common termination criteria are: reaching a fixed number of edge (804) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (804) values are no longer intended to be altered, the neural network (800) is said to be "trained."

While embodiments discussing ML model type have mostly focused on artificial neural networks, one skilled in the art will appreciate that this process, of determining the composition of a gas mixture flowing in a pipe based on a plurality of pressure signals measured by a plurality of pressure sensors, is not limited to the listed ML models. ML models such as random forests, support vector machines, or non-parametric methods such as K-nearest neighbors may be readily inserted into this framework and do not depart from the scope of this disclosure. In addition, a person of ordinary skill in the art will appreciate that embodiments of the present disclosure include computational models that do not use ML models. That is, in one or more embodiments, the composition of the gas may be determined using a computational model that uses, for example, an empirical look-up table of gas mixtures flowing in different conditions as well as the corresponding pressure signals associated with such flowing gas mixtures and conditions. Alternatively, or in addition, mathematical inference techniques may be applied to the measure pressure signals, before or after digital signal processing, to determine the composition of the gas.

Figure 9:
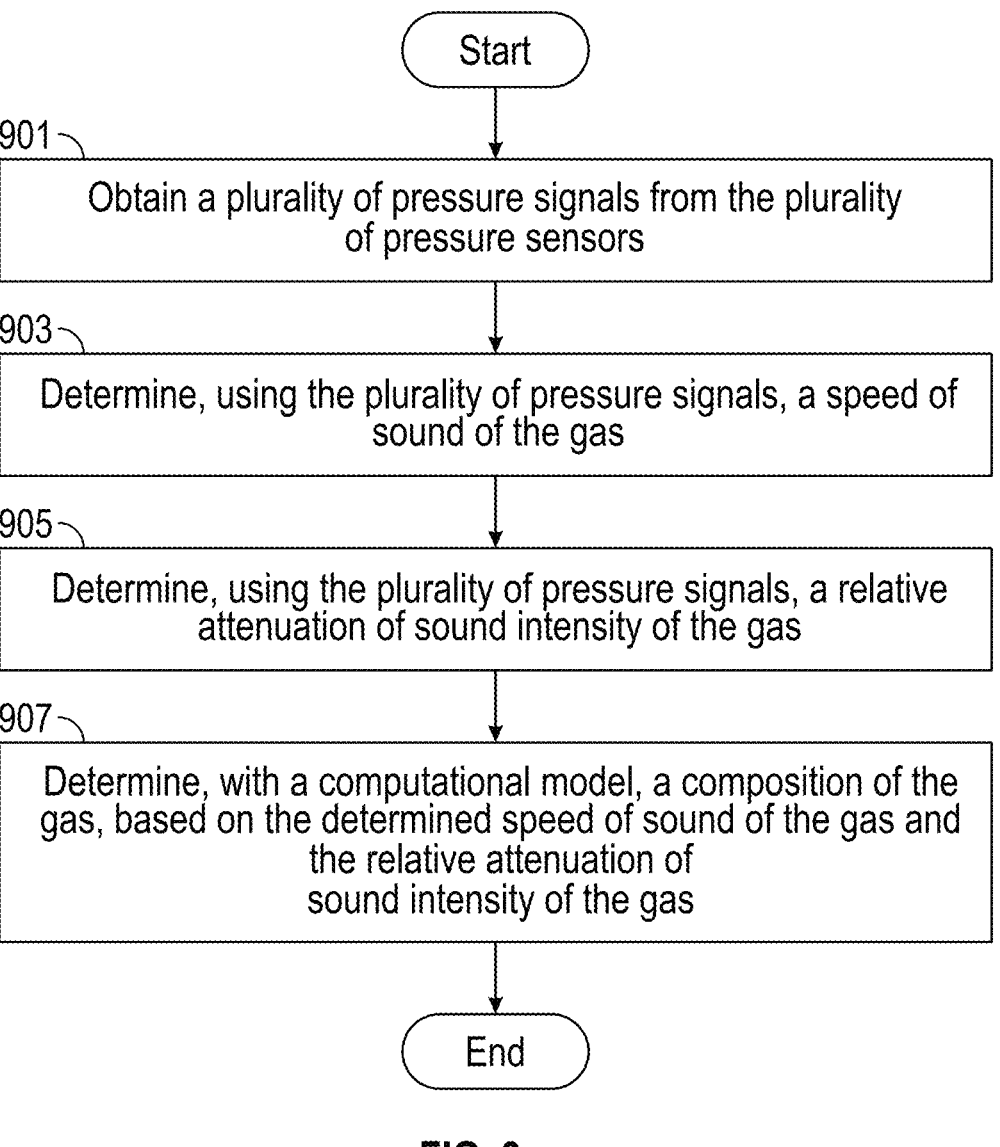
FIG. 9 depicts a flowchart in accordance with one or more embodiments.

In accordance with one or more embodiments, FIG. 9 depicts a flowchart outlining the steps to determine a composition of a gas in a fluid-carrying conduit, such as a pipe, using a plurality of pressure sensors (302) disposed along the pipe. It is assumed that the pressure sensors each include a diaphragm for sensing pressure, that the diaphragm of each pressure sensor is aligned with the inner wall of the pipe such that each pressure sensor is flush mounted on the inner wall of the pipe. Further, it is assumed that relative locations of the pressure sensors on the fluid-carrying conduit are known. Each pressure sensor outputs a pressure signal which may be considered a series of pressure values in time. In Block 901, the plurality of pressure signals is obtained from the plurality of pressure sensors (302). Because there is a pressure signal for each pressure sensor in the plurality of pressure sensors, it may be said that there is a plurality of pressure signals without undue ambiguity. The plurality of pressure signals may be obtained or received by a pressure control system, such as a SCADA (125) system or other computing device.

In Block 903, a speed of sound of the gas is determined using the plurality of pressure signals. In Block 905, a attenuation of intensity of the flowing gas is determined using the plurality of pressure signals. Various methods (e.g., cross-correlation, Fourier transform, f-k diagram analysis) have been described above and in FIGS. 5A-5C and FIGS. 7A and 7B illustrating how both the speed of sound and the attenuation of sound intensity of the flowing gas may be determined using the plurality of pressure signals.

In Block 907, the composition of the gas is determined using computational model, based on the determined speed of sound and the attenuation of the sound intensity of the flowing gas. As has been discussed, both the speed of sound of a given gas or gas mixture and the sound intensity attenuation is sensitive to the composition of the gas (as well as its bulk properties, such as pressure and temperature). Accordingly, these features may be considered characteristic of particular gases and their combinations.

In accordance with one or more embodiments, a control valve within the pipe may be opened or closed in response to the determination of the composition of the gas. Opening or closing the control valve within the fluid conduit may be included as a step towards achieving several possible objectives. For example, opening or closing the control valve may be a necessary safety measure to regulate the flow characteristics of gas in the pipe. In addition, or alternatively, opening or closing the control valve may be used to partition a portion of gas to estimate the gas energy density, or to separate portion a portion of gas for transporting the gas elsewhere, for example, to a storage or processing facility.

One with ordinary skill in the art will recognize that many alterations can be readily applied to the system and methods disclosed herein. Select alterations are discussed below. Any of these alterations, or combinations thereof, can be employed as alternate embodiments without departing from the scope of this disclosure. For example, in one or more embodiments, two or more pressure sensors can be placed at the same axial location to improve the signal-to-noise ratio. In one or more embodiments, two pressure sensors are installed at each axial location such that the plurality of pressure sensors is arranged in a double-helical pattern. In one or more embodiments, the plurality of pressure sensors may be disposed "inline" along a pipe with all of the gas flowing through the pipe, "online" along a pipe with a representative slipstream of gas flowing through the pipe, or in an isolated sample chamber containing a representative sample from the main flow line. For the inline online embodiments, many acoustic sources may be considered to induce the pressure signals as measured by the plurality of pressure sensors. For example, in one or more embodiments, pressure waves may be caused by flow-induced turbulence or by a present piping element, such as a choke, an orifice, a slotted plane, a v-cone, a blind-tee fitting, a pipe elbow, or a thermowell. Alternatively, an active acoustic source may be considered, vibrating at a single or narrow frequency, or across a broadband of frequencies. In addition, a passive acoustic source may be considered, such as a tuning fork that vibrates at one or more discrete frequencies. For sample chamber embodiments, the active and passive acoustic sources described above may be considered. In one or more sample chamber embodiments, a shock-wave generator or a "gas-gun" may be attached in proximity to the plurality of pressure sensors. The shockwave generator or gas-gun may include a fast-acting valve and a pressurized gas cylinder such that when the fast-acting valve is actuated, a shock wave travels across the plurality of pressure sensors. In this case, the speed of the shock wave is analogous to the speed of sound a gas in a pipe and may be calculated in similar ways as suggested for the speed of sound (e.g., via cross-correlation and Fourier analysis). Further, the amplitude of the fluctuations and its transience across time and distance may be considered analogous to the frequency-dependent attenuation of the sound intensity. Finally, the manner in which the shock wave spreads as it travels through the sample chamber may be considered analogous to the behavior of the sound speed dispersion in the frequency domain, as described above. Each of these features of the shockwave also share the property that they are characteristic of the medium through which the shock wave propagates, and as such, may be used to determine the composition of the gas sample.

Embodiments of the present disclosure may provide at least one of the following advantages. The system has no moving parts and is non-intrusive, resulting in hardware reliability (which is advantageous for field implementation). The plurality of pressure sensors is full-bore, resulting in negligible pressure-drop across the sensors. In the most common situation, the pressure sensors are installed with threaded (e.g., NPT) connections, yielding easy serviceability/maintenance. The system is not dependent on profile, size, or thickness of the fluid-carrying conduit. The plurality of pressure sensors allows for a direct measurement of flow pressure because the diaphragms are in contact with the fluid. Whereas, for example, strain gauge-based sensors suffer from dilution/distortion of the pressure signal due to transfer-function of the conduits mechanical/vibrational properties (which could change with other factors such as temperature). Further, in systems with strain gauge-based sensors, the entire pipe is known to expand and/or contract which may result in crosstalk between adjacent sensors, thus reducing signal-to-noise ratio. Additionally, the expansion and contraction of the pipe may limit how close the strain gauges can be installed next to each other, thus reducing spatial resolution. Embodiments disclosed herein, through a direct measurement of flow pressure with flush-mounted sensors overcomes both these issues, especially when the plurality of pressure sensors is arranged helically according to one or more embodiments of the instant disclosure.

Embodiments of the instant disclosure determine the composition of gas using pressure signals across a range of frequencies. This enables making full use of the frequency-dependent nature of speed of sound within gases, as well as the relative sound intensity attenuation, both of which exhibit known acoustic behavior over a range of frequencies, leading further insight into the composition of the medium (gas) through which the pressure signals propagate. Further, acoustic determination of gas composition is preferrable to optical inference, such as systems that use near or mid-infrared radiation to infer gas composition, for gases with weak optical signatures including hydrogen. Embodiments of the instant disclosure typically operate on frequencies below the ultrasonic regime (<20 kHz) which is advantageous when considering sound intensity attenuation as sound energy absorption increases with frequency. Further, it is known the carbon dioxide attenuates significantly in the ultrasonic regime, suggesting embodiments of the instant disclosure may be useful in applications involving carbon dioxide.

Figure 10:
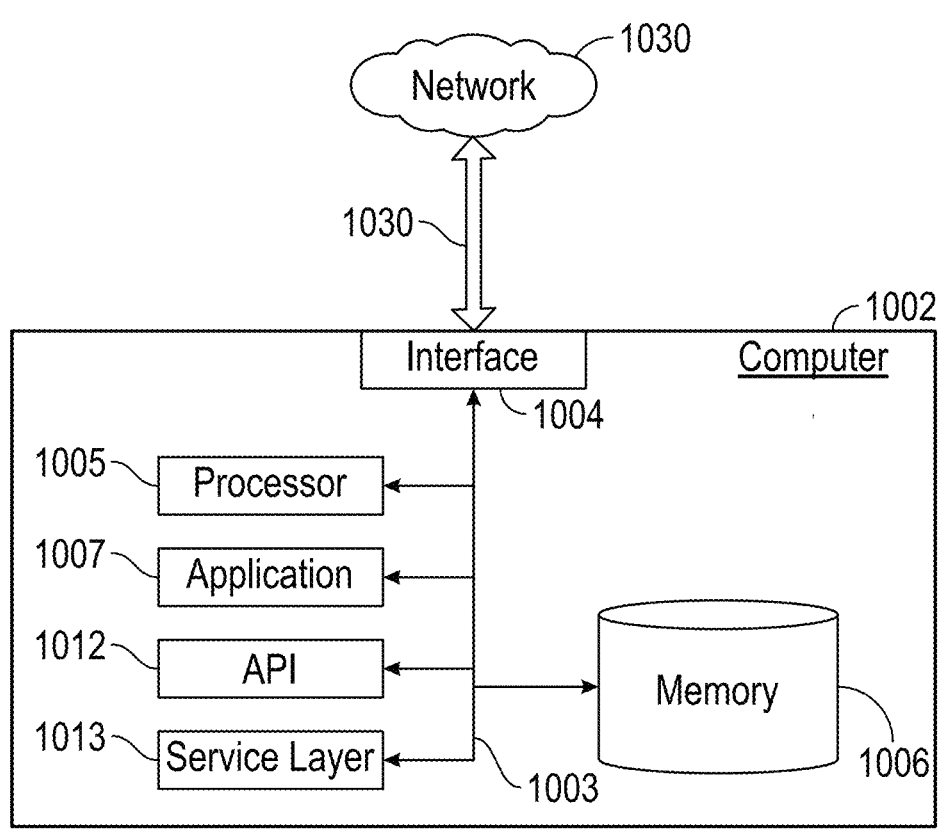
FIG. 10 depicts a system in accordance with one or more embodiments.

FIG. 10 further depicts a block diagram of a computer system (1002) (e.g., the pressure control system) used to provide computational functionalities associated with the methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). The memory may be a non-transitory computer readable medium. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:

propagating acoustic waves through a gas;

obtaining, using each of a plurality of pressure sensors disposed adjacent to the gas, each of a plurality of pressure signals in response to the acoustic waves;

determining a dispersion relation of the acoustic waves using the plurality of pressure signals;

determining a speed of sound of the acoustic waves using the dispersion relation;

determining an attenuation of the acoustic waves using the dispersion relation; and determining, with a computational model, a composition of the gas using the speed of sound and the attenuation.

2. The method of claim 1, wherein determining the dispersion relation comprises applying a two-dimensional Fourier transform to the plurality of pressure signals.

3. The method of claim 1, wherein the computational model comprises a machine learning model comprising an artificial neural network.

4. The method of claim 1, further comprising:

determining a dispersion of the acoustic waves using the dispersion relation; and determining, with the computational model, the composition of the gas using the speed of sound, the attenuation, and the dispersion.

5. The method of claim 1, further comprising:

obtaining, using a first sensor, a pressure of the gas;

obtaining, using a second sensor, a temperature of the gas; and determining, with the computational model, that determines the composition of the gas using the speed of sound, the attenuation, the pressure, and the temperature.

6. The method of claim 1:

wherein the plurality of pressure sensors is disposed on a sample chamber that contains the gas.

7. The method of claim 6, wherein propagating the acoustic waves through the gas comprises generating, using a shockwave generator, the acoustic waves.

8. The method of claim 1, further comprising opening or closing a control valve within a pipe that the gas flows through in response to the composition of the gas.

9. A system comprising:

a plurality of pressure sensors disposed adjacent to a gas and configured to obtain a plurality of pressure signals in response to acoustic waves; and a pressure control system comprising a processor and a memory, the pressure control system configured to:

receive, from each of the plurality of pressure sensors, each of the plurality of pressure signals, determine a dispersion relation of the acoustic waves using the plurality of pressure signals, determine a speed of sound of the acoustic waves using the dispersion relation, determine an attenuation of the acoustic waves using the dispersion relation, and determine, with a computational model, a composition of the gas using the speed of sound and the attenuation.

10. The system of claim 9, further comprising:

a first sensor configured to obtain a pressure of the gas; and a second sensor configured to obtain a temperature of the gas, wherein the pressure control system is configured to determine, with the computational model, the composition of the gas using the speed of sound, the attenuation, the pressure, and the temperature.

11. The system of claim 9, further comprising:

a sample chamber configured to contain the gas, wherein the plurality of pressure sensors is disposed along the sample chamber.

12. The system of claim 11, further comprising:

a shockwave generator configured to generate the acoustic waves.

13. A non-transitory computer-readable memory comprising computer-executable instructions stored thereon that, when executed on a processor, cause the processor to perform:

receiving, from each of a plurality of pressure sensors in response to acoustic waves propagating through a gas, each of a plurality of pressure signals;

determining a dispersion relation of the acoustic waves using the plurality of pressure signals;

determining a speed of sound of the acoustic waves using the dispersion relation;

determining an attenuation of the acoustic waves using the dispersion relation; and determining, with a computational model, a composition of the gas using the speed of sound and the attenuation.

14. The non-transitory computer-readable memory of claim 13, further causing the processor to perform:

determining a dispersion of the acoustic waves using the dispersion relation; and determining, with the computational model, the composition of the gas using the speed of sound, the attenuation, and the dispersion.

15. The method of claim 1, wherein determining the speed of sound of the acoustic waves comprises:

determining a power ridge within the dispersion relation;

determining an average velocity along the power ridge; and determining the speed of sound of the acoustic waves using the average velocity.

16. The method of claim 1, wherein determining the attenuation of the acoustic waves comprises:

determining a power ridge within the dispersion relation;

determining a slope of the power ridge; and determining the attenuation of the acoustic waves using the slope.

17. The method of claim 4, wherein determining the dispersion of the acoustic waves comprises:

determining a power ridge within the dispersion relation;

determining an inflection point of the power ridge; and determining the dispersion of the acoustic waves using the inflection point.

18. The method of claim 1, wherein the acoustic waves have a frequency below 20 kilohertz.

19. The method of claim 3, wherein determining, with the computational model, the composition of the gas, comprises:

inputting the speed of sound and the attenuation into the trained machine learning model; and predicting the composition of the gas from the trained machine learning model in response to the speed of sound and the attenuation.

* * * * *